United States Patent
Yato

(10) Patent No.: US 9,622,020 B2
(45) Date of Patent: Apr. 11, 2017

(54) COMMUNICATION DEVICE AND COMMUNICATION METHOD

(71) Applicant: Sony Computer Entertainment Inc., Tokyo (JP)

(72) Inventor: Chitoku Yato, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/428,735

(22) PCT Filed: Jul. 19, 2013

(86) PCT No.: PCT/JP2013/004424
§ 371 (c)(1),
(2) Date: Mar. 17, 2015

(87) PCT Pub. No.: WO2014/045503
PCT Pub. Date: Mar. 27, 2014

(65) Prior Publication Data
US 2015/0223011 A1  Aug. 6, 2015

(30) Foreign Application Priority Data

Sep. 24, 2012  (JP) ................................. 2012-210131
Sep. 24, 2012  (JP) ................................. 2012-210132

(51) Int. Cl.
*H04B 5/00* (2006.01)
*H04W 4/00* (2009.01)
(Continued)

(52) U.S. Cl.
CPC ........... *H04W 4/008* (2013.01); *H04W 4/206* (2013.01); *H04W 8/005* (2013.01); *H04W 76/023* (2013.01); *H04W 84/18* (2013.01)

(58) Field of Classification Search
CPC ... H04W 8/005; H04W 76/023; H04W 4/008; H04W 76/02; H04W 52/0254
(Continued)

(56) References Cited

U.S. PATENT DOCUMENTS 7,725,831 B2   5/2010   Kamijo
7,907,901 B1   3/2011   Kahn
(Continued)

FOREIGN PATENT DOCUMENTS

EP   2424281 A1   2/2012
JP   2003188805 A   7/2003
(Continued)

OTHER PUBLICATIONS

International Preliminary Report on Patentability and Written Opinion for corresponding Application PCT/JP2013/004424, 18 pages, dated Apr. 2, 2015.
(Continued)

*Primary Examiner* — Ping Hsieh
(74) *Attorney, Agent, or Firm* — Matthew B. Dernier, Esq.

(57) ABSTRACT

A communication system includes a game machine and a headset. The headset detects a state change in the present device, the state change in the present device being caused by a predetermined action of a user, and transmits a signal indicating the state change in the present device to the game machine. The game machine receives, from at least one of one or more external devices, a signal indicating a state change in the external device. The game machine identifies a partner device in predetermined communication processing from among the one or more external devices on the basis of the received signal indicating the state change.

13 Claims, 14 Drawing Sheets

(51) Int. Cl.
*H04W 8/00* (2009.01)
*H04W 4/20* (2009.01)
*H04W 76/02* (2009.01)
*H04W 84/18* (2009.01)

(58) Field of Classification Search
USPC .............................................. 455/41.1, 41.2
See application file for complete search history.

(56) References Cited

U.S. PATENT DOCUMENTS

| | | | |
|---|---|---|---|
| 8,391,786 B2 * | 3/2013 | Hodges | G06F 1/1626 455/3.01 |
| 8,699,948 B2 | 4/2014 | Takatsuka | |
| 2005/0117066 A1 | 6/2005 | Kamijo | |
| 2007/0220255 A1 | 9/2007 | Igarashi | |
| 2010/0227556 A1 | 9/2010 | Kim | |
| 2012/0122396 A1 * | 5/2012 | Ha | H04W 52/288 455/41.1 |
| 2012/0190299 A1 | 7/2012 | Takatsuka | |
| 2013/0029596 A1 * | 1/2013 | Preston | H04L 63/18 455/41.1 |

FOREIGN PATENT DOCUMENTS

| | | |
|---|---|---|
| JP | 2005159821 A | 6/2005 |
| JP | 2007249425 A | 9/2007 |
| JP | 2009188764 A | 8/2009 |
| JP | 2012157006 A | 8/2012 |

OTHER PUBLICATIONS

Office Action for corresponding JP Patent Application 2012-210131, dated Sep. 29, 2015.
International Search Report for corresponding Application PCT/JP2013/004424, dated Sep. 17, 2013.
European Search Report for corresponding Application EP13839525, 7 pages, dated Feb. 8, 2016.

* cited by examiner (a) MOVE DEVICE DESIRED TO BE CONNECTED ACCORDING TO CUE (b) 3, 2, 1, MOVE (a) COVER ANTENNA PORTION OF DEVICE DESIRED TO BE CONNECTED WITH BOTH HANDS ACCORDING TO FIRST CUE, AND REMOVE BOTH HANDS ACCORDING TO SECOND CUE (b) 3, 2, 1, COVER (c) 3, 2, 1, REMOVE

COMMUNICATION DEVICE AND COMMUNICATION METHOD

TECHNICAL FIELD

The present invention relates to a data communication technology, and particularly to a communication device and a communication method.

BACKGROUND ART

Information devices that support short-range wireless communication such as Bluetooth ("Bluetooth" is a registering trademark) or the like have now come into wide use.

SUMMARY

Technical Problem

The present inventor has considered that as many information devices support Bluetooth, a problem has become evident in that a user is required to perform a complex operation when connecting desired devices among a plurality of Bluetooth-compatible devices to each other, and therefore the convenience of the user is reduced.

The present invention has been made on the basis of the recognition of the above problem by the present inventor. It is a main object of the present invention to provide a technology for suppressing a reduction in the convenience of the user when connecting a plurality of information devices to each other.

Solution to Problem

In order to solve the above problem, according to a mode of the present invention, there is provided a communication device including: a receiving section receiving, from at least one of one or more external devices, a signal indicating a state change in the external device, the state change being caused by a predetermined action of a user; and an identifying section identifying a partner device in predetermined communication processing from among the one or more external devices on a basis of the signal indicating the state change.

Another mode of the present invention is also a communication device. The device includes: a detecting section detecting a state change in the present device, the state change being caused by a predetermined action of a user; and a transmitting section transmitting a signal indicating the state change in the present device, the state change being detected by the detecting section, to a different communication device to be set as a partner in predetermined communication processing, to make the different communication device identify a partner device in the predetermined communication processing from among one or more external devices on a basis of the signal indicating the state change caused by the predetermined action of the user.

Yet another mode of the present invention is a communication method. The method is a method performed by a communication device, the method including: a step of receiving, from at least one of one or more external devices, a signal indicating a state change in the external device, the state change being caused by a predetermined action of a user; and a step of identifying a partner device in predetermined communication processing from among the one or more external devices on a basis of the signal indicating the state change.

Yet another mode of the present invention is also a communication method. The method is a method performed by a communication device, the method including: a step of detecting a state change in the present device, the state change being caused by a predetermined action of a user; and a step of transmitting a signal indicating the detected state change in the present device to a different communication device to be set as a partner in predetermined communication processing, to make the different communication device identify a partner device in the predetermined communication processing from among one or more external devices on a basis of the signal indicating the state change caused by the predetermined action of the user.

Yet another mode of the present invention is a communication device. The device includes: a setting information retaining section retaining data of a reference sound including a component of an echo sound produced by an external device, the reference sound being a sound assumed to occur when a predetermined physical stimulus is applied to the external device, and setting information for wireless communication with the external device, in association with each other; a detecting section detecting a sound actually occurring when the physical stimulus is applied to the external device; a checking section checking the sound detected by the detecting section and the reference sound against each other; and a communication processing section performing processing for wireless communication with the external device according to the setting information associated with the reference sound when the detected sound and the reference sound match each other.

Yet another mode of the present invention is a communication method. The method is a method performed by a communication device performing wireless communication with an external device, the method including: a step of detecting a sound actually occurring when a predetermined physical stimulus is applied to the external device; a step of referring to a storage area storing, in advance, data of a reference sound including a component of an echo sound produced by the external device, the reference sound being a sound assumed to occur when the predetermined physical stimulus is applied to the external device, and checking the sound detected in the detecting step and the reference sound against each other; and a step of performing processing for the wireless communication with the external device according to setting information for the wireless communication with the external device, the setting information being stored in association with the reference sound in advance, when the detected sound and the reference sound match each other.

It is to be noted that arbitrary combinations of the above constituent elements as well as modes obtained by converting expressions of the present invention between a device, a method, a system, a program, a recording medium storing the program, and the like are also effective as modes of the present invention.

Advantageous Effect of Invention

According to the present invention, a reduction in the convenience of a user when a plurality of information devices are connected to each other can be suppressed.

DESCRIPTION OF EMBODIMENTS

Figure 1:
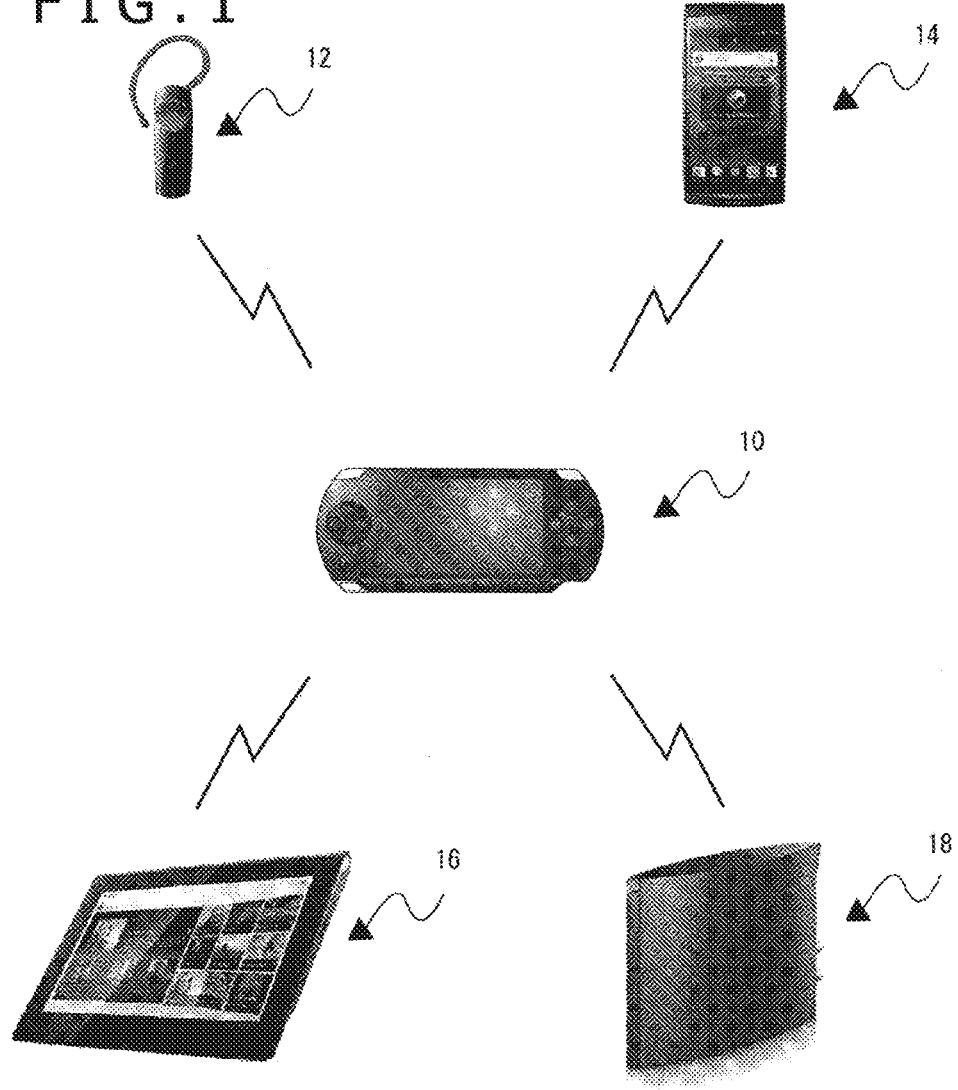
FIG. 1 is a diagram showing a configuration of a communication system according to an embodiment.

FIG. 1 shows a configuration of a communication system 100 according to an embodiment. The configuration of the communication system 100 is common to a first embodiment and a second embodiment to be described later. The communication system 100 includes a portable type game machine 10, a headset 12 into which headphones and a microphone are integrated, a smart phone 14, a tablet terminal 16, and a storage device 18 storing multimedia data. Each of the devices of the communication system 100 is an information device placed within a vicinity range of a few meters to a few ten meters (within the house of a user, for example), and is also a communication device that supports short-range wireless communication. Suppose in the present embodiment that each of the devices of the communication system 100 is a Bluetooth-compatible device, and mutually exchanges data by Bluetooth communication.

Heretofore, a Bluetooth-compatible device having a display, such as the game machine 10 or the like, may have detected other Bluetooth-compatible devices present in the vicinity, displayed a list of the other Bluetooth-compatible devices, and allowed a user to select a partner device to be connected. However, an operation of selecting a partner device is not necessarily easy, but may be complex and difficult to understand for the user.

In addition, a Bluetooth-compatible device not provided with a display, such as the headset 12 or the like, may have specifications for, when power is turned on, being automatically reconnected to an external device last connected before the turning off of the power. In this case, when the headset 12 is connected to the smart phone 14 immediately before the turning off of the power, for example, the headset 12 is reconnected to the smart phone 14 even if the user desires to connect the headset 12 and the game machine 10 to each other at the time of turning on the power. The user therefore needs to perform an operation of changing the connection destination from the smart phone 14 to the game machine 10. Thus, the convenience of the user may be reduced.

A pairing technology referred to as OOB (Out Of Band) has also been proposed which determines a connection destination to be connected by Bluetooth, using a communication system other than Bluetooth, for example NFC (Near Field Communication) or the like. However, OOB requires a separate communication module supporting a communication system other than Bluetooth, such as NFC or the like, and thus entails high cost.

Thus, as many information devices support Bluetooth, a problem has become evident in that a user is required to perform a complex operation for connecting desired devices among a plurality of Bluetooth-compatible devices to each other, and therefore the convenience of the user is reduced. Then, concrete methods for effectively suppressing the reduction in the convenience of the user at a time of connecting a plurality of information devices to each other have thus far not been proposed sufficiently.

Accordingly, in embodiments, technologies are proposed which establish a connection between desired devices by Bluetooth on the basis of an intuitive operation easily understandable to the user, the intuitive operation being hitting the devices desired to be connected against each other, or in other words making the devices lightly butting against each other. Specifically, as a first embodiment, a communication system 100 will be described in which devices to be connected are made to collide with each other so that a common state change is detected, and a connection partner is identified according to a degree of matching between state changes respectively detected by the devices to be connected. In addition, as a second embodiment, a communication system 100 will be described in which a connection source device gives a physical stimulus (impact) to a connection destination device, and identifies the connection partner on the basis of a sound generated by the stimulus.

In the following first and second embodiments, description will be made of examples in which devices to be connected are the game machine 10 and the headset 12, and a Bluetooth connection is established between these devices. However, the technologies described in the embodiments are of course applicable also to cases where other devices (for example the smart phone 14, the tablet terminal 16, and the storage device 18) are devices to be connected and cases where a connection system is other than Bluetooth.

First Embodiment

Figure 2:
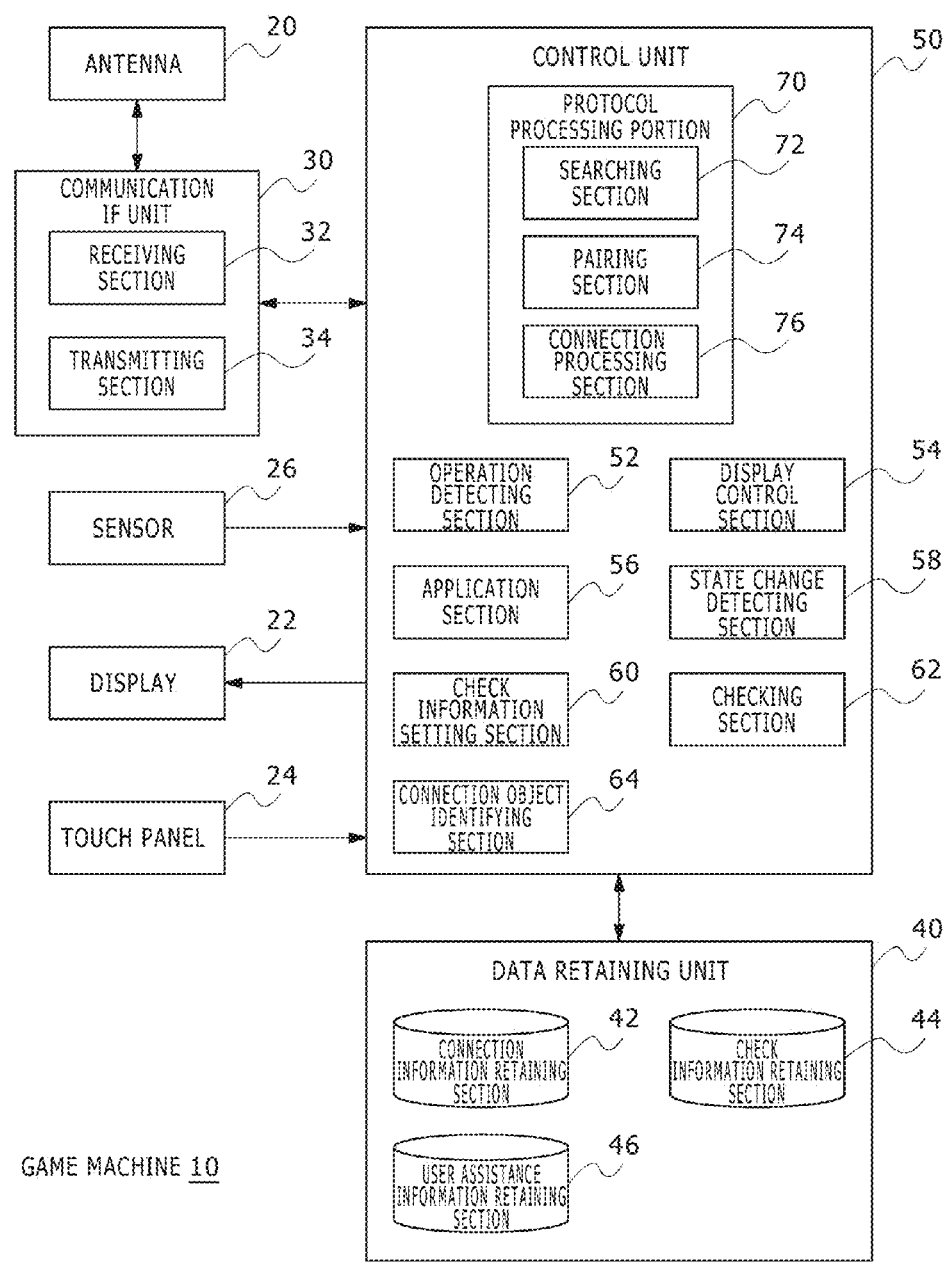
FIG. 2 is a block diagram showing a functional configuration of a game machine in FIG. 1.

FIG. 2 is a block diagram showing a functional configuration of the game machine 10 in FIG. 1. The game machine 10 includes an antenna 20, a display 22, a touch panel 24, a sensor 26, a communication IF unit 30, a data retaining unit 40, and a control unit 50.

Each block shown in the block diagram can be implemented by the CPU of a computer, a memory, and other elements and a mechanical device in terms of hardware, and is implemented by a computer program and the like in terms of software. In this case, however, the functional blocks implemented by cooperation of these are depicted. Hence, it is to be understood by those skilled in the art that these functional blocks can be implemented in various forms by combinations of hardware and software. The same is true for subsequent block diagrams.

For example, functions of the control unit 50 may be implemented by storing program modules corresponding to the respective functional blocks of the control unit 50 in a flash memory of the game machine 10, and reading out these program modules to a main memory and executing the program modules as appropriate on the part of a CPU of the game machine 10. In addition, the data retaining unit 40 may be implemented by the flash memory and the main memory of the game machine 10. In addition, the functions in FIG. 2 may be implemented by installing, onto the game machine 10 having a predetermined sensor, a computer program in which functions of a state change detecting section 58, a check information setting section 60, a checking section 62, and a connection object identifying section 64 are implemented.

The communication IF unit 30 is a wireless communication interface in the game machine 10. The communication IF unit 30 includes a receiving section 32 and a transmitting section 34. The receiving section 32 receives a radio signal sent by an external device via the antenna 20, and passes the radio signal to the control unit 50. The transmitting section 34 transmits (sends) a radio signal representing data addressed to the external device, the radio signal being sent out from the control unit 50, to the outside via the antenna 20.

The display 22 is a liquid crystal display. The touch panel 24 is a multi-touch panel. In the present embodiment, a multi-touch screen into which the display 22 and the touch panel 24 are integrated is included in the game machine 10.

The sensor 26 is a publicly known sensor that detects a fact that the game machine 10 and an external device abut against each other (the abutment including contact, pressure contact, collision, and the like), or in other words a state change in the game machine 10 which state change is actually caused by the abutting of the game machine 10 and the external device against each other. The sensor 26 in the present embodiment is a triaxial acceleration sensor that detects the direction and magnitude of a motion (vibration) of the game machine 10 which motion is caused by collision with an external device (and an operation by the user intending to cause the collision). The sensor 26 sends out a signal indicating the direction and magnitude of the motion of the game machine 10 to the control unit 50. As a modification, the sensor 26 may be a pressure sensor that detects a fact that a pressure is applied from an external device and which sends out a signal indicating the fact that the pressure is applied from the external device and the magnitude of the pressure to the control unit 50. The sensor 26 may also be a touch sensor that detects a fact that an external device is in contact, and which sends out a signal indicating the fact that the external device is in contact to the control unit 50.

The data retaining unit 40 is a storage area that retains various kinds of data for data processing by the control unit 50. The data retaining unit 40 includes a connection information retaining section 42, a check information retaining section 44, and a user assistance information retaining section 46.

The connection information retaining section 42 retains information necessary to establish a connection with an external Bluetooth-compatible device (which information will hereinafter be referred to also as "connection information"). The connection information may be for example a record associating a device ID, an address (Bluetooth address), and a passkey (PIN) of the external device with each other. The connection information is set at a time of Bluetooth pairing.

The check information retaining section 44 retains check information to be checked against information indicating a state change in an external device which information is notified from the external device. Specifically, the check information retaining section 44 retains, as the check information, information indicating a state change in the game machine 10 which state change is detected by the sensor 26. More specifically, the check information retaining section 44 retains, as the check information, time stamp information indicating a time of the detection of the state change by the sensor 26.

The check information in this case can be said to be information indicating the state change expected to be detected in the external device that has abutted against the game machine 10. In the present embodiment, the game machine 10 and a connection object device are made to abut against each other, or in other words an environmental change common to both of the game machine 10 and the connection object device is given so that the common state change is detected in both of the devices. Hence, it is expected that a sensor of the connection object device also detects the state change at a time approximate to a time of detection of the state change in the game machine 10 by the sensor 26.

The user assistance information retaining section 46 retains information for prompting for an action of the user which action is necessary to establish a connection between the game machine 10 and an external device by Bluetooth (which information will hereinafter be referred to also as "user assistance information"). For example, the user assistance information is data to be displayed on the display 22, and may be a message or an image for giving an instruction to make an information device desired to be connected to the game machine 10 lightly collide with the game machine 10.

The control unit 50 performs various kinds of data processing for controlling the game machine 10. The control unit 50 includes an operation detecting section 52, a display control section 54, an application section 56, a state change detecting section 58, a check information setting section 60, a checking section 62, a connection object identifying section 64, and a protocol processing portion 70.

The protocol processing portion 70 performs processing in conformity with a predetermined wireless communication protocol. The protocol processing portion 70 for example performs processing of searching for an external device and processing of connection to the external device according to a procedure defined by the predetermined wireless communication protocol. The wireless communication protocol in the present embodiment is Bluetooth. The protocol processing portion 70 includes a searching section 72, a pairing section 74, and a connection processing section 76.

The searching section 72 transmits a search (Inquiry) signal via the transmitting section 34, the search signal being a radio signal for finding Bluetooth-compatible devices present in a vicinity range of a few meters to a few ten meters. Then, the searching section 72 obtains a search response (Inquiry Response) signal via the receiving section 32, the search response signal being a radio signal in response to the search signal, the radio signal being transmitted from an information device that is a Bluetooth-compatible device present in the vicinity range and is in a searchable state (connection standby state). The searching section 72 sends the search signal to the outside at a time of pairing processing by the pairing section 74 and at a time of connection processing by the connection processing section 76.

The searching section 72 receives a search response signal as a response to the search signal from an external device, for example, each of the headset 12 to the storage device 18 placed in the vicinity of the game machine 10. Suppose in the present embodiment that the game machine 10 and the headset 12 abut against each other. With a configuration of the headset 12 to be described later, information indicating a state change caused by the collision with the game machine 10 (specifically time stamp information indicating a time of detection of the state change) is included in the search response signal from the headset 12. That is, a search response signal provided with a time stamp is returned from a device which is placed in a vicinity position where the search signal from the game machine 10 can be received, which can perform protocol processing similar to that of the headset 12 to be described later and the detection and notification of a state change, and which has detected a state change (caused by abutting against the game machine 10 or the like).

The pairing section 74 performs pairing processing defined by the Bluetooth standard, that is, external device registration processing. Specifically, the pairing section 74 recognizes Bluetooth-compatible devices present in the vicinity range on the basis of search response signals obtained by the searching section 72, and displays list information of these on the display 22 via the display control section 54. When the user selects an external device to be paired on the touch panel 24 on the display 22, the pairing section 74 performs predetermined pairing processing (for example input or exchange of a passkey) for the selected external device. Then, the pairing section 74 stores, in the connection information retaining section 42, connection information (for example a device ID, an address, and a passkey) for connection to the external device, the connection information being obtained as a result of the pairing processing.

When a connection partner device is determined by the connection object identifying section 64 to be described later, the connection processing section 76 sets a connection request signal (Page signal) for establishing a connection by Bluetooth according to connection information related to the connection partner device. Then, the connection processing section 76 transmits the set connection request signal to the connection partner device via the transmitting section 34. For example, the connection request signal may be data that specifies the device ID and address of the connection partner device and which is encrypted by a passkey.

The operation detecting section 52 detects an operating input to the touch panel 24 by the user. The display control section 54 sends out video data or image data to be used for screen display to the display 22 to display various kinds of video or images on the display 22. For example, the display control section 54 displays user assistance information retained by the user assistance information retaining section 46, and displays a screen for selecting a pairing object device or a connection object device.

The application section 56 executes a predetermined application (for example game software), and displays resulting video or images on the display 22 via the display control section 54. In addition, the application section 56 obtains details of an operation on the touch panel 24 by the user via the operation detecting section 52, and the execution of the application is controlled according to the details of the operation. In addition, when data is to be transmitted and received to and from an external device in executing the application, the application section 56 transmits data to the external device and receives data from the external device using a wireless communication session established by the connection processing section 76. For example, the audio data of a game is transmitted to the headset 12, and is made to be output from a speaker of the headset 12.

The state change detecting section 58 receives a signal indicating a state change in the game machine 10 from the sensor 26. The check information setting section 60 stores time stamp information indicating a time of detection of the state change by the state change detecting section 58, for example a time of reception of the state change signal from the sensor 26, as check information in the check information retaining section 44. On condition that magnitude of motion or a vibration equal to or more than a predetermined threshold value is detected by the sensor 26 as an acceleration sensor, the check information setting section 60 may store time stamp information indicating a time of detection of the motion or the vibration in the check information retaining section 44. In addition, in a case where the sensor 26 is a pressure sensor, on condition that magnitude of pressure equal to or more than a predetermined threshold value is detected, the check information setting section 60 may store time stamp information indicating a time of detection of the pressure in the check information retaining section 44. These threshold values may be an expected value expected to be detected when connection object devices are made to abut against each other lightly, and may be determined as appropriate on the basis of the knowledge of a developer, an experiment using the communication system 100, or the like.

In the present embodiment, connection object devices are made to abut against each other, and timings (that is, times of detection) of state changes in both of the devices which state changes are caused by the abutment are compared and checked against each other. As a modification, details of the state changes (for example the magnitudes, directions, and the like of vibrations) may be compared and checked against each other. In this case, check information indicating the details of a state change is recorded.

The checking section 62 determines whether or not a search response signal received from each of one or more external devices includes information indicating a state change in the external device (time stamp information indicating a time of detection of the state change in the present embodiment). When the information is included, the checking section 62 determines a matching degree, the matching degree being a degree of matching between the time indicated by the time stamp information of the search response signal and the time indicated by the time stamp information of the check information. When a difference between the times is equal to or less than a predetermined threshold value, the checking section 62 determines that the time stamp information of the search response signal and the time stamp information of the check information match each other. The threshold value may be a difference between detection times which difference is expected when connection object devices are made to abut against each other lightly and both of the devices detect a state change. The threshold value may be a value indicating an allowable range of the difference. The threshold value may be determined as appropriate on the basis of the knowledge of a developer, an experiment using the communication system 100, or the like.

When the checking section 62 determines that the time indicated by the time stamp information of the search response signal and the time indicated by the time stamp information of the check information match each other, the connection object identifying section 64 identifies the transmission source of the search response signal as a partner device to which to establish a Bluetooth connection. In other words, the transmission source of the search response signal is determined as an opposite device in a wireless communication by Bluetooth. The connection object identifying section 64 passes identifying information of the connection partner device which identifying information is included in the search response signal to the connection processing section 76 to establish a wireless communication session between the game machine 10 and the connection partner device.

Incidentally, when no search response signal matching the check information is detected, the checking section 62 displays list information of Bluetooth-compatible devices that have returned a search response signal on the display 22 via the display control section 54. When the user selects an external device to be connected on the touch panel 24 on the display 22, the connection object identifying section 64 recognizes the selected external device as a connection partner device, and makes a wireless communication session established between the game machine 10 and the connection partner device.

Figure 3:
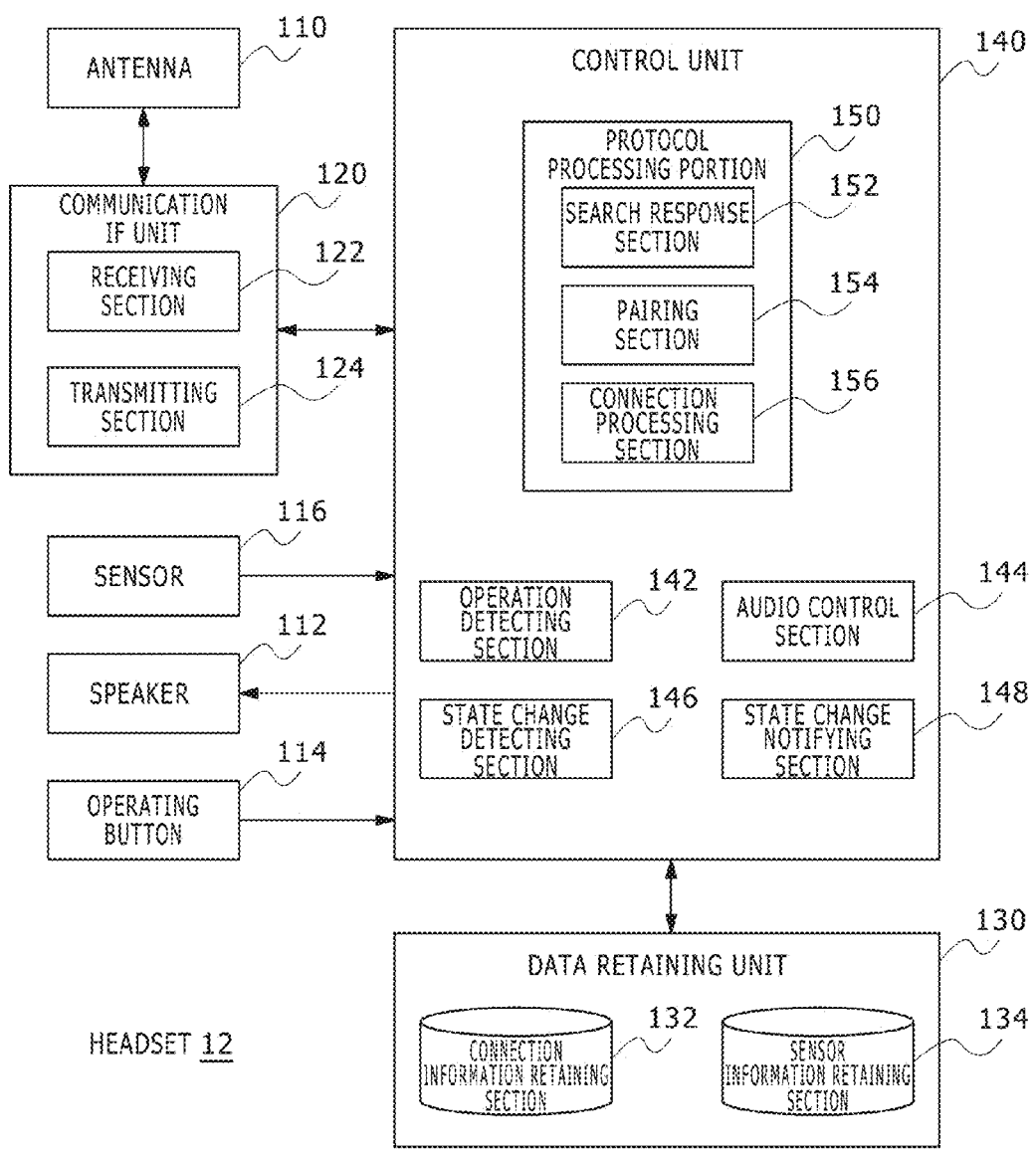
FIG. 3 is a block diagram showing a functional configuration of a headset in FIG. 1.

FIG. 3 is a block diagram showing a functional configuration of the headset 12 in FIG. 1. The headset 12 includes an antenna 110, a speaker 112, an operating button 114, a sensor 116, a communication IF unit 120, a data retaining unit 130, and a control unit 140.

For example, functions of the control unit 140 may be implemented by a dedicated electronic circuit. In addition, the functions of the control unit 140 may be implemented by storing program modules corresponding to the respective functional blocks of the control unit 140 in a flash memory of the headset 12, and reading out these program modules to a main memory and executing the program modules as appropriate on the part of a CPU of the headset 12. In addition, the data retaining unit 130 may be implemented by the flash memory and the main memory of the headset 12. In addition, the functions in FIG. 3 may be implemented by installing, onto the headset 12 having a predetermined sensor, a computer program in which functions of a state change detecting section 146 and a state change notifying section 148 are implemented.

The communication IF unit 120 is a wireless communication interface in the headset 12. The communication IF unit 120 includes a receiving section 122 and a transmitting section 124. The receiving section 122 receives a radio signal sent by an external device via the antenna 110, and passes the radio signal to the control unit 140. The transmitting section 124 transmits (sends) a radio signal representing data addressed to the external device, the radio signal being sent out from the control unit 140, to the outside via the antenna 110.

The sensor 116 is a publicly known sensor that detects a fact that the headset 12 and an external device abut against each other (the abutment including pressure contact, contact, collision, and the like), or in other words a state change in the headset 12 which state change is actually caused by the abutting of the headset 12 and the external device against each other. The sensor 116 in the present embodiment is a triaxial acceleration sensor that detects the direction and magnitude of a motion (vibration) of the headset 12 which motion is caused by collision with an external device (and an operation by the user intending to cause the collision). The sensor 116 sends out a signal indicating the direction and magnitude of the motion of the headset 12 to the control unit 140. As a modification, the sensor 116 may be a pressure sensor which detects a fact that a pressure is applied from an external device, and which sends out a signal indicating the fact that the pressure is applied from the external device and the magnitude of the pressure to the control unit 140. The sensor 116 may also be a touch sensor which detects a fact that an external device is in contact, and which sends out a signal indicating the fact that the external device is in contact to the control unit 140.

The data retaining unit 130 is a storage area that retains various kinds of data for data processing by the control unit 140. The data retaining unit 130 includes a connection information retaining section 132 and a sensor information retaining section 134.

The connection information retaining section 132 retains connection information necessary to establish a connection with an external Bluetooth-compatible device. The connection information may be for example a record associating a device ID, an address, and a passkey (that is, a "PIN") of the external device with each other. The connection information is set at a time of Bluetooth pairing. The sensor information retaining section 134 retains information indicating a state change in the headset 12 which state change is detected by the sensor 116. Specifically, suppose that the sensor information retaining section 134 retains time stamp information indicating a time of detection of the state change by the sensor 116.

The control unit 140 performs various kinds of data processing for controlling the headset 12. The control unit 140 includes an operation detecting section 142, an audio control section 144, a state change detecting section 146, a state change notifying section 148, and a protocol processing portion 150.

The protocol processing portion 150 performs processing in conformity with a predetermined wireless communication protocol. The protocol processing portion 150 for example performs processing of connection to an external device according to a procedure defined by the predetermined wireless communication protocol. The wireless communication protocol in the present embodiment is Bluetooth. The protocol processing portion 150 includes a search response section 152, a pairing section 154, and a connection processing section 156.

The search response section 152 receives a search signal transmitted from an external device via the receiving section 122, and transmits a search response signal via the transmitting section 124. As will be described later, the search response section 152 transmits an extended search response (Extended Inquiry Response) signal.

The pairing section 154 performs pairing processing defined by the Bluetooth standard, that is, external device registration processing. Specifically, the pairing section 154 receives a pairing request signal transmitted from an external device via the receiving section 122, and performs the predetermined pairing processing (for example input or exchange of a passkey) on the basis of the pairing request signal. Then, the pairing section 154 stores connection information (for example a device ID, an address, and a passkey) for connection to the external device, the connection information being obtained as a result of the pairing processing, in the connection information retaining section 132.

The connection processing section 156 obtains a connection request signal transmitted from an external device via the receiving section 122, and establishes a connection to the transmission source of the connection request signal by performing connection processing (for example page operation) defined by the Bluetooth standard.

The operation detecting section 142 detects an operating input to the operating button 114 by the user. The audio control section 144 controls audio output by the speaker 112.

Specifically, the audio control section 144 obtains audio data transmitted from the external device via the receiving section 122, and passes the audio data to the speaker 112 for audio output. Though not shown in FIG. 3, the headset 12 has a microphone, and also has a function of detecting ambient sound on the basis of a signal output from the microphone and outputting the audio data to the outside. For example, the detected audio data may be transmitted to the external device such as the game machine 10 or the like via the transmitting section 124.

The state change detecting section 146 receives a signal indicating a state change in the headset 12 from the sensor 116. The state change detecting section 146 stores time stamp information indicating a time of detection of the state change, for example a time of reception of the state change signal from the sensor 116, in the sensor information retaining section 134. On condition that magnitude of a motion or a vibration equal to or more than a predetermined threshold value is detected by the sensor 116 as an acceleration sensor, the state change detecting section 146 may store time stamp information indicating a time of detection of the motion or the vibration in the sensor information retaining section 134. In addition, in a case where the sensor 116 is a pressure sensor, on condition that a pressure equal to or more than a predetermined threshold value is detected, time stamp information indicating a time of detection of the pressure may be stored in the sensor information retaining section 134. These threshold values may be an expected value expected to be detected when connection object devices are made to abut against each other lightly, and may be determined as appropriate on the basis of the knowledge of a developer, an experiment using the communication system 100, or the like.

The state change notifying section 148 notifies the game machine 10 of information indicating the state change in the headset 12, the information being retained in the sensor information retaining section 134, or the time stamp information of the state change in the headset 12 in the present embodiment. When a search signal from an external device is received, the state change notifying section 148 adds the time stamp information of the state change to an extended search response signal to be transmitted by the search response section 152. The search response section 152 transmits the extended search response signal to which the time stamp information of the state change is added.

Figure 4:
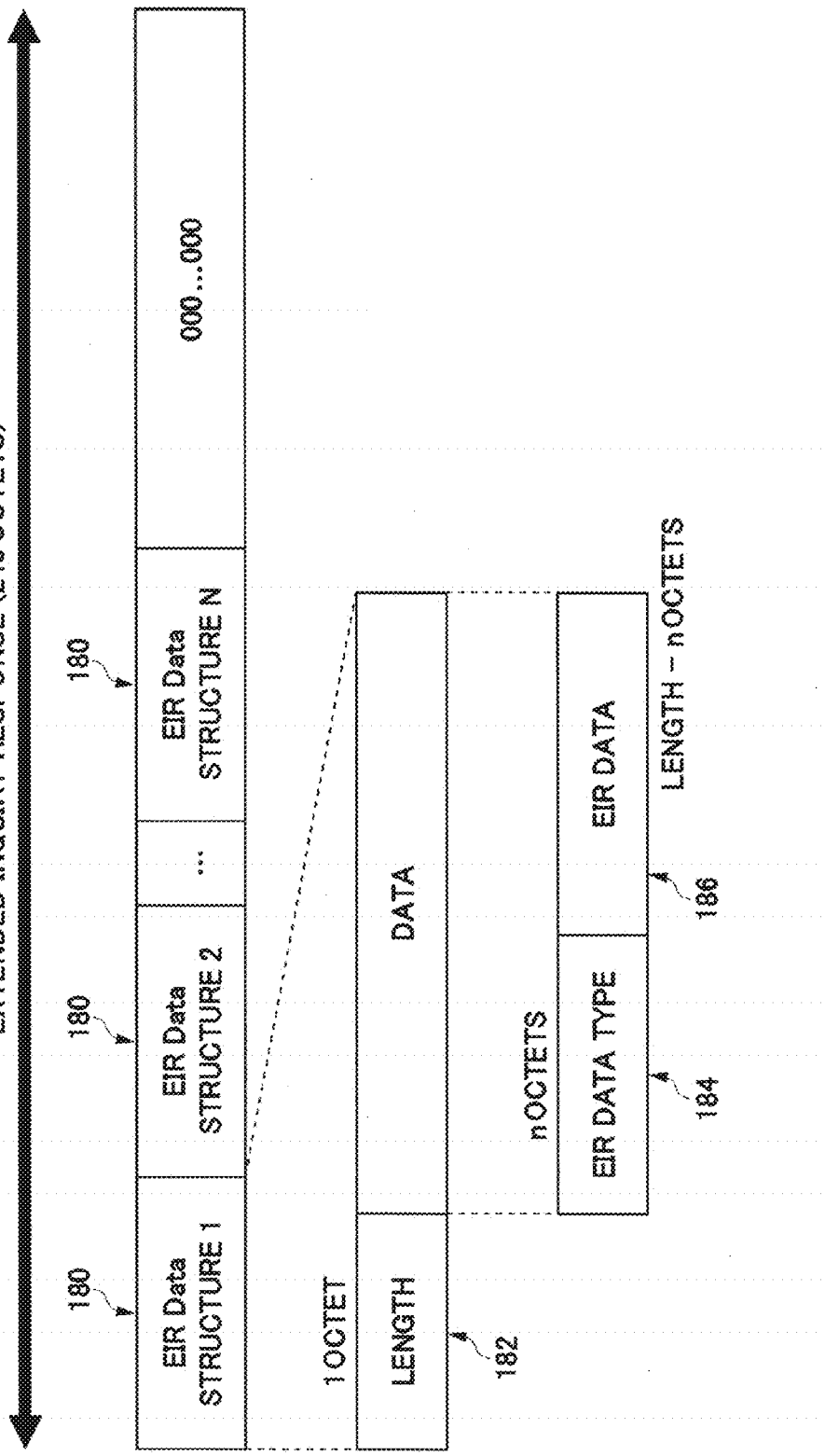
FIG. 4 is a diagram showing a configuration of a search response signal.

FIG. 4 shows a configuration of the extended search response signal. The extended search response signal includes a plurality of variable-length EIR structures 180. An EIR structure 180 includes a length field 182, an EIR data type field 184, and an EIR data field 186. For example, the search response section 152 may set a type value indicating a device ID in the EIR data type field 184 of the first EIR structure 180 of the extended search response signal, and set the device ID (identifying information unique to the headset 12) in the EIR data field 186 of the first EIR structure 180 of the extended search response signal.

On the other hand, the state change notifying section 148 may set a predetermined type value indicating state change information in the EIR data type field 184 of the second EIR structure 180 of the extended search response signal, and set the time stamp information of the state change, which time stamp information is retained in the sensor information retaining section 134, in the EIR data field 186 of the second EIR structure 180 of the extended search response signal. Incidentally, the type value indicating the state change information may be a value selected by a designer among unreserved (unused) type values in the Bluetooth standard, and may be "0xDD," for example.

Description will be made of operation of the game machine 10 and the headset 12 that have the above-described configurations.

Figure 5:
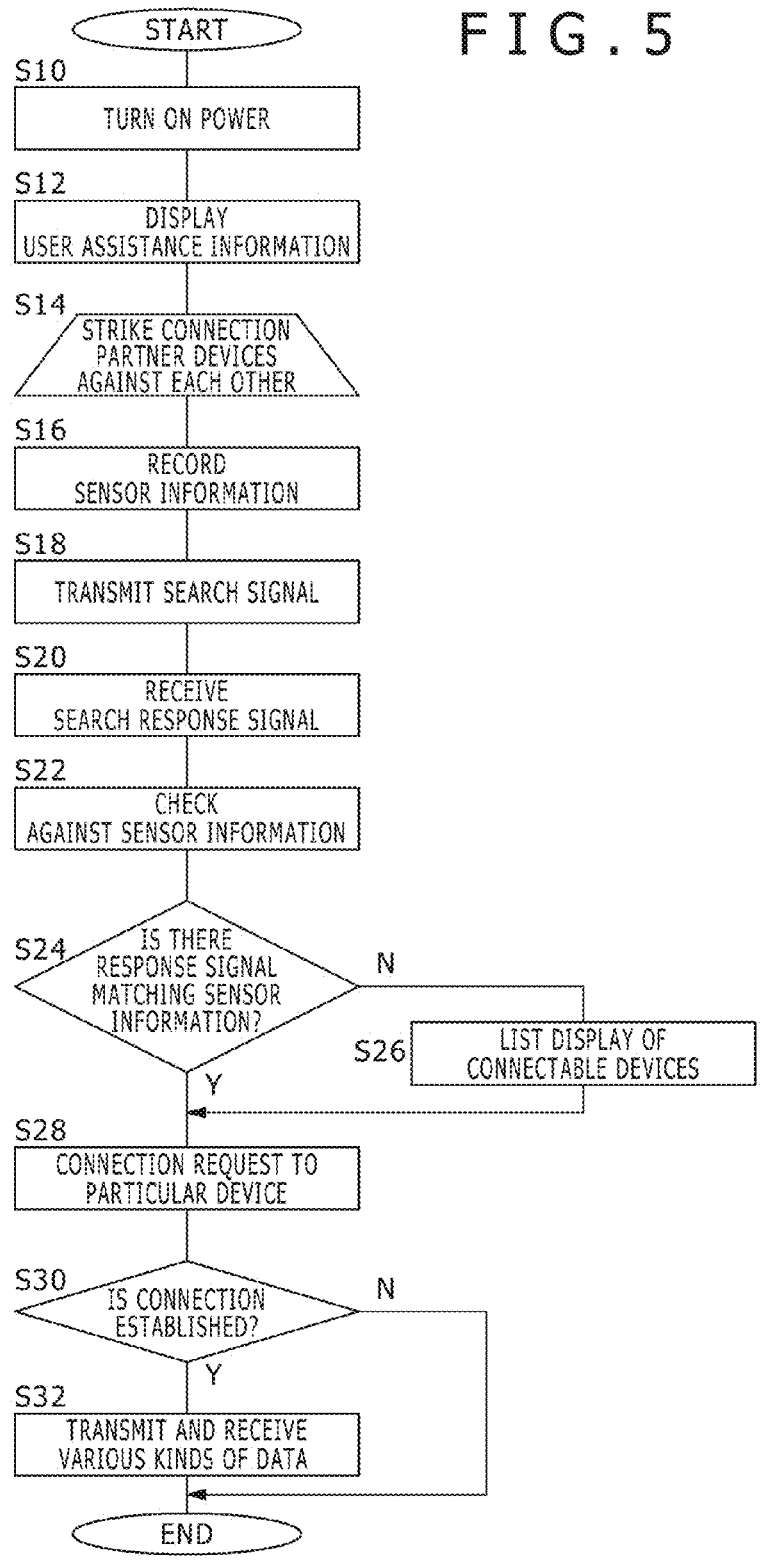
FIG. 5 is a flowchart of operation of the game machine in FIG. 1.

FIG. 5 is a flowchart showing the operation of the game machine 10 in FIG. 1. Though not shown in the figure, suppose in this case that the game machine 10 is already paired with each of external Bluetooth-compatible devices (the headset 12, the smart phone 14, the tablet terminal 16, and the storage device 18), and has already stored connection information related to each of the devices.

Suppose in the present example that when power to the game machine 10 is turned on (S10), processing of connection to an external device by Bluetooth is performed. The display control section 54 displays user assistance information retained by the user assistance information retaining section 46 on the display 22 to prompt the user to perform an operation for butting against a connection partner device (S12). According to the user assistance information, the user makes the game machine 10 and a desired connection partner device (the headset 12 in this case) butt against each other (S14). At this time, the state change detecting section 58 detects a state change in the game machine 10 via the sensor 26, and the check information setting section 60 records time stamp information indicating a time of occurrence of the state change as check information in the check information retaining section 44 (S16). The searching section 72 transmits a search signal to the outside (S16), and receives a search response signal from each of the plurality of Bluetooth-compatible devices present in the vicinity (the headset 12, the smart phone 14, the tablet terminal 16, and the storage device 18) (S20).

The checking section 62 determines whether or not each of the plurality of search response signals includes state change information (time stamp information). Then, as for a search response signal including time stamp information, the checking section 62 determines whether or not the time stamp information and the time stamp information represented by the check information match each other (S22). Specifically, the checking section 62 identifies, of the plurality of search response signals, a search response signal as matching the check information when (1) the search response signal is an extended search response signal, (2) the search response signal includes an EIR structure 180 whose EIR data type field 184 has a type value indicating the state change information, and (3) a difference between the time indicated by the time stamp information of the EIR data field 186 and the time indicated by the time stamp information as the check information is within a predetermined range. When a search response signal matching the check information is identified (Y in S24), the connection object identifying section 64 determines the transmission source device of the search response signal as a connection partner device. In the example of the present embodiment, only the headset 12, which has detected an impact common to the headset 12 and the game machine 10, satisfies all of the above conditions (1) to (3), and thus the headset 12 is determined as a connection partner device.

In addition, when a plurality of search response signals are identified as matching the check information, the connection object identifying section 64 determines, as a connection partner device, the transmission source device of a search response signal having a smallest difference with respect to the time indicated by the time stamp information as the check information. Further, when no search response signal matching the check information is identified (N in S24), the display control section 54 displays, on the display 22, a selecting screen that makes list display of one or more external devices that have returned a search response signal and which prompt the user to select a connection partner device (S26). Then, the connection object identifying section 64 determines an external device selected by the user on the selecting screen as a connection partner device. As a modification of S26, an information device registered as a predetermined connection destination in advance in the headset 12 by the user or an information device to which the headset 12 was last connected may be determined as a connection partner device.

The connection processing section 76 transmits a connection request signal to the connection partner device determined by the connection object identifying section 64, using connection information related to the connection partner device (S28). After a connection to the connection partner device is established (Y in S30), the application section 56 transmits and receives various kinds of data related to application processing to and from the connection partner device (S32). For example, when the connection partner device is the headset 12, the application section 56 transmits audio data to be output from the speaker in executing an application to the headset 12. When the connection to the connection partner device is not established yet (N in S30), S32 is skipped.

Figure 6:
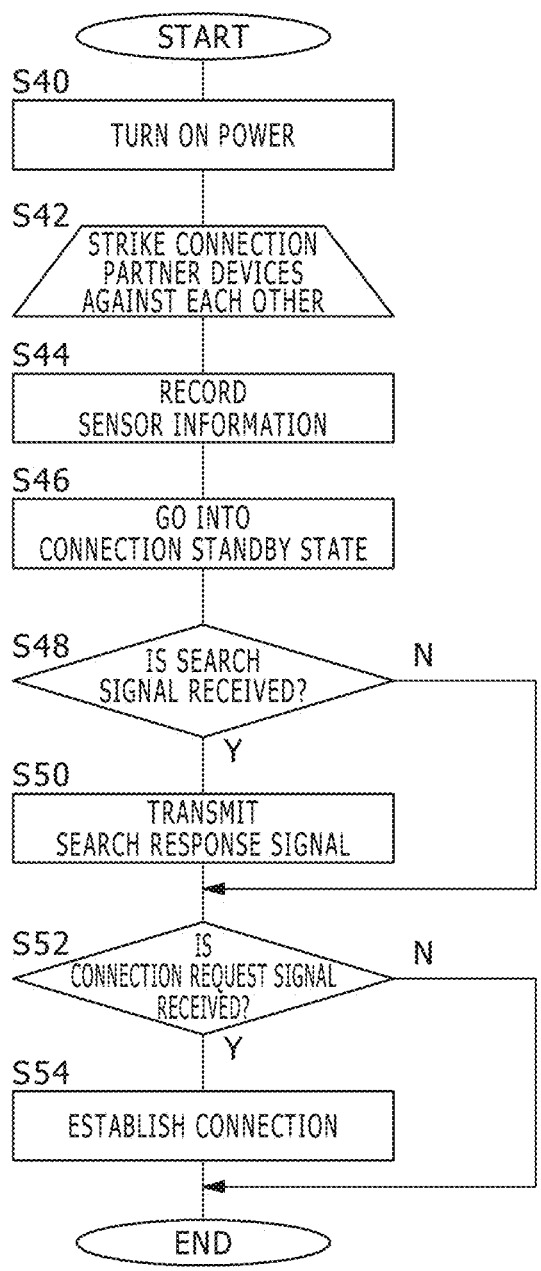
FIG. 6 is a flowchart of operation of the headset in FIG. 1.

FIG. 6 is a flowchart of the operation of the headset 12 in FIG. 1. The user turns on power to the headset 12 (S40), and makes the headset 12 and a desired connection partner device (the game machine 10 in this case) butt against each other (S42). At this time, the state change detecting section 146 detects a state change in the headset 12 via the sensor 116, and records time stamp information indicating a time of occurrence of the state change in the sensor information retaining section 134 (S44). The protocol processing portion 150 makes a transition to a state of being able to receive a search request and a connection request from the external device (connection standby state) (S46).

When a search signal transmitted from the game machine 10 is received (Y in S48), the state change notifying section 148 adds the time stamp information retained in the sensor information retaining section 134 to an extended search response signal. The search response section 152 transmits the extended search response signal to which the time stamp information is added to the game machine 10 (S50). When no search signal is received yet (N in S48), S50 is skipped. When a connection request signal transmitted from the game machine 10 is received (Y in S52), the connection processing section 156 establishes a Bluetooth connection to the game machine 10 (S54). When no connection request signal is received yet (N in S52), S54 is skipped. When the receiving section 122 thereafter receives audio data transmitted from the game machine 10, the audio control section 144 passes the audio data to the speaker 112 for audio output.

The flowcharts of FIG. 5 and FIG. 6 show flows in which power is first turned on, then sensor information (time stamp information) resulting from collision is recorded, and search processing is performed. However, the turning on of power may of course not be a trigger for starting the flows. As an example, the game machine 10 and the headset 12 may be made to abut against each other in a state in which the power to the headset 12 is off, or in other words a state in which the CPU of the headset 12 is stopped. In this case, the sensor 116 of the headset 12 outputs an interrupt signal for starting the CPU. The CPU of the headset 12 starts up with the interrupt signal as a trigger, so that the communication function (protocol processing portion 70) of the headset 12 starts up. In addition, in this case, the state change notifying section 148 of the headset 12 may set information indicating an elapsed time since the startup of the CPU or a time of the startup of the CPU as information indicating the state change in the search response signal in place of the sensor information. The game machine 10 may retain information indicating an elapsed time since detection of the state change caused by the abutment with the headset 12 or a time of the detection, and check the information against the information notified from the headset 12. In this example, the operation of turning on the power to the headset 12 is unnecessary, and the user can establish a connection between the game machine 10 and the headset 12 by merely making the game machine 10 and the headset 12 abut against each other.

As another example, when the game machine 10 is made to abut against the headset 12 while the game machine 10 is connected to a device (for example the smart phone 14) other than the headset 12, the game machine 10 may be disconnected from the smart phone 14 with detection of a state change caused by the abutment as a trigger. Then, a flow may be performed which flow includes the transmission of a search signal, the obtainment of search response signals, the identification of a new communication partner device (that is, the headset 12), and the establishment of a connection to the headset 12. Incidentally, on condition that a new communication partner device is identified, the connection thus far to the communication partner device (for example the smart phone 14) may be cut off. In other words, on condition that the presence of the other device that has detected a state change common to the own device and the other device can be confirmed, the connection thus far to the communication partner device may be cut off.

According to the communication system 100 according to the first embodiment, even when many Bluetooth-compatible devices are present in the vicinity range, the user can easily establish a connection between desired devices by an intuitive operation of making the desired devices lightly butt against each other. For example an operation for finding and selecting a desired device from among a plurality of devices on a screen for selecting a connection partner device, an operation for disconnecting a session with a present connection partner device and establishing a new connection to a desired device, or the like is unnecessary. Thus the complexity of the user operation can be reduced. That is, a reduction in the convenience of the user at a time of connecting desired devices to each other in an environment in which a plurality of information devices are present can be suppressed.

In addition, when already sold information devices have a sensor capable of detecting a state change involved in the butting of the devices against each other (for example an acceleration sensor or the like), the connection system according to the embodiment can be easily realized by introducing a necessary function module into firmware or the like. Further, even when neither of information devices to be connected to each other has a screen interface (for example when the headset 12 and the storage device 18 are desired to be connected to each other), the connection system according to the embodiment is useful. In the past, information devices without a screen interface may have specifications for reconnection to an external device last connected before power is turned off or waiting for an external connection request. In the present embodiment, when information devices without a screen interface are connected to each other, the devices can be connected to each other easily by an intuitive operation of making the devices butt against each other.

The present invention has been described above on the basis of the first embodiment. The embodiment is illustrative, and it is to be understood by those skilled in the art that combinations of constituent elements and processing processes of the embodiment are susceptible of various modifications and that such modifications also fall within the scope of the present invention. Modifications will be shown in the following.

A first modification of the first embodiment will be described. In the foregoing embodiment, connection object devices (the game machine 10 and the headset 12) are made to abut against each other, a state change common to both of the devices is detected, and detection details in both of the devices are checked against each other. As a modification, one of the connection object devices (that is a device corresponding to the game machine 10 in the embodiment, and will hereinafter be referred to as a "connection source device") may retain, in advance, check information indicating a state change assumed to occur (to be detected) in the other of the connection object devices (that is a device corresponding to the headset 12 in the embodiment, and will hereinafter be referred to as a "connection destination device") due to a predetermined action of the user. In the present modification, it suffices for the user to perform an action such for example as tapping or vibrating only the connection destination device. The connection destination device detects a state change caused by the action of the user which action is performed on the connection destination device itself, and notifies information indicating the state change by a search response signal. The connection source device extracts the information indicating the actual state change detected in the connection destination device from the search response signal of the connection destination device, determines matching with the assumed state change indicated by the check information, and identifies the connection destination device as a connection partner device.

The check information may be time stamp information indicating timing (for example a time) in which a state change is assumed to occur in the connection destination device. The connection destination device may notify time stamp information indicating timing in which a state change was detected by the sensor of the connection destination device itself by an extended search response signal. In addition, the check information may be information indicating details of a state change (for example the direction and magnitude of a motion) assumed to occur in the connection destination device. The connection destination device may notify information indicating details of a state change detected by the sensor of the connection destination device itself by an extended search response signal.

Figure 7:
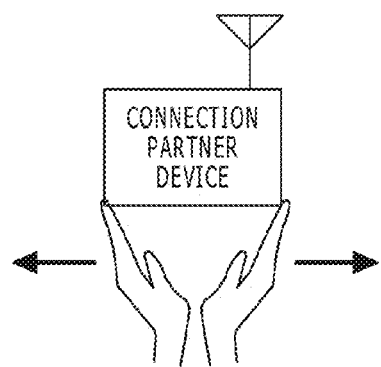
FIG. 7 is a diagram schematically showing user assistance information displayed on a display.
Figure 8:
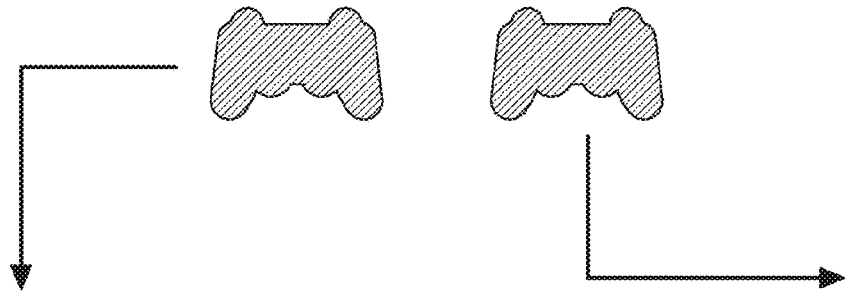
FIG. 8 is a diagram schematically showing user assistance information displayed on the display.

In the first modification, the display control section 54 of the connection source device preferably displays, on the display, user assistance information for prompting the user to perform a predetermined action on the connection destination device. FIG. 7 and FIG. 8 schematically show user assistance information displayed on the display. FIG. 7 shows user assistance information in a case where the check information is time stamp information indicating timing in which a state change is assumed to occur in the connection destination device. The display control section 54 of the connection source device sequentially displays messages (a) and (b) in the figure. In displaying the message (b), the display control section 54 displays "3, 2, 1," and thereafter displays an instruction "MOVE." The check information setting section 60 of the connection source device stores time stamp information indicating a time of the display of the instruction "MOVE" in the check information retaining section 44. The connection destination device notifies time stamp information indicating a time of detection of a motion of the connection destination device itself by an extended search response signal.

FIG. 8 shows user assistance information in a case where the check information is information indicating details of a state change assumed to occur in the connection destination device. In this case, an example is shown in which a controller as a connection destination device is connected to a stationary type game machine as a connection source device. The connection destination device (controller) detects the magnitude and direction of a motion of the connection destination device itself by a built-in triaxial acceleration sensor, and notifies the detection details to the connection source device (stationary type game machine) by an extended search response signal. Incidentally, as shown in FIG. 8, when a plurality of connection destination devices (controllers) are simultaneously moved according to an instruction, each of the plurality of connection destination devices may notify details of a state change to the connection source device. The connection source device may check the details of the state changes in the plurality of connection destination devices against a plurality of pieces of check information (defining details of state changes assumed in the respective connection destination devices). Then, Bluetooth connection processing between the connection source device and the plurality of controllers (connection destination devices) may be performed collectively. Also in this case, timing may of course be checked in place of the details of the state changes.

According to the first modification, in timing and by a method which timing and method are specified by one information device (connection source device), the user performs a predetermined action on the other information device (connection destination device). Therefore, only the connection destination device needs to have a sensor configured to detect a state change, and the connection source device does not need to have the sensor. The first modification is suitable also for cases where it is difficult for the user to move the connection source device directly because the connection source device is a stationary type device, for example. In addition, the connection source device can improve matching between the check information of the connection source device and the detection information in the connection destination device by making screen display of user assistance information.

A second modification of the first embodiment will be described.

Figure 9:
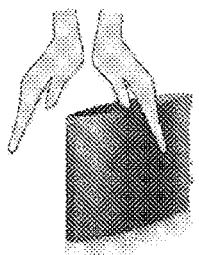
FIG. 9 is a diagram schematically showing user assistance information displayed on the display.

The second modification relates to the foregoing first modification. However, the action of the user which action is performed on the connection destination device in the second modification is an action of changing the strength of a signal from the connection destination device to the connection source device. In addition, the check information represents timing in which the strength of the signal from the connection destination device is assumed to be changed and/or an assumed mode of the change. FIG. 9 schematically shows user assistance information displayed on the display. The display control section 54 of the connection source device sequentially displays messages (a), (b), and (c) in the figure. In displaying the message (b), the display control section 54 displays "3, 2, 1," and thereafter displays an instruction "COVER." In addition, in displaying the message (c), the display control section 54 displays "3, 2, 1," and thereafter displays an instruction "REMOVE." The check information setting section 60 of the connection source device stores time stamp information indicating a time of the display of the instruction "COVER" as check information in the check information retaining section 44.

The state change detecting section 58 of the connection source device obtains the strengths of signals from external Bluetooth-compatible devices which signals are received in the receiving section 32, and recognizes changes in the strengths of the signals of the respective devices. When an amount of change between strengths of a signal before and after covering with the hands of the user is equal to or larger than a predetermined amount, the amount of change is detected. For example, the searching section 72 may send a search signal each time a certain time has passed, and the receiving section 32 may receive a plurality of search response signals in response to a plurality of search signals from each device. The state change detecting section 58 may then monitor a change in signal strength in time series for each device. The checking section 62 determines whether or not a time that the state change detecting section 58 detected that the strength of a signal from a particular external device was weakened from a previous value by a predetermined amount or more (as another example, the time may be a time that the state change detecting section 58 detected that the strength of the signal became less than a predetermined threshold value) matches the time stamp information of the check information. The connection object identifying section 64 then identifies, as a connection partner, the external device whose signal strength was weakened in timing matching the time stamp information of the check information. That is, the connection source device identifies, as a connection partner, the external device whose signal strength was weakened in timing in which the user assistance information instructed the user to cover the antenna with the hands.

According to the second modification, in addition to effects of the first modification, the connection destination device does not need the sensor either. The second modification is suitable also for cases where it is difficult for the user to move the connection destination device directly because the connection destination device is a stationary type device, for example.

A third modification of the first embodiment will be described.

In the foregoing embodiment, a plurality of information devices to be connected to each other, that is, the game machine 10 as a connection source device and the headset 12 as a connection destination device are made to abut against each other directly, and both of the devices detect a state change involved in the abutment. As a modification, the connection source device may be connected to an external device that has a physically different casing and which has a sensor configured to detect a state change (which device will hereinafter be referred to as an "accessory device"), and information indicating a state change in the accessory device due to abutment of the accessory device and the connection destination device against each other may be obtained from the accessory device and stored as check information. In addition, the connection destination device may be similarly connected to an accessory device, and information indicating a state change in the accessory device due to abutment of the accessory device and the connection source device against each other may be obtained from the accessory device, and stored in the sensor information retaining section 134 and set in a search response signal. Further, the accessory device of the connection source device and the accessory device of the connection destination device may be made to abut against each other.

Figure 10:
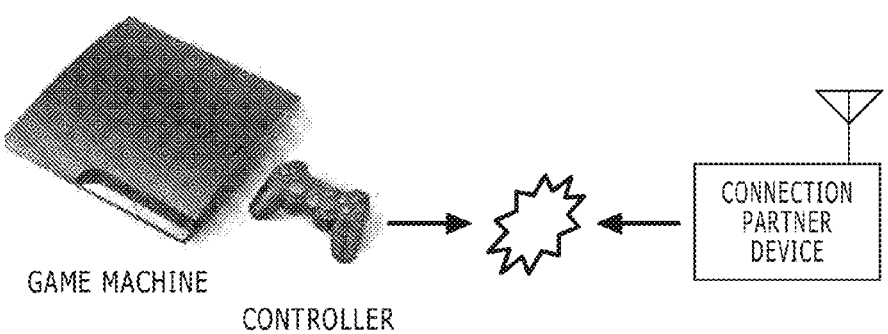
FIG. 10 is a diagram schematically showing user assistance information displayed on the display.

FIG. 10 schematically shows user assistance information displayed on the display. A stationary type game machine as a connection source device is connected to a controller as the accessory device of the connection source device, and the user assistance information in the figure instructs the user to make the controller and a connection destination device butt against each other. According to the third modification, even when a connection object device itself does not have a sensor, a wireless connection to an external device can be realized easily. In addition, the third modification is suitable also for cases where it is difficult for the user to move the connection object device directly because the connection object device is a stationary type device, for example.

A fourth modification of the first embodiment will be described.

In order to detect a state change in connection object devices, sound may be used instead of making the connection object devices collide with each other. In this case, the sensor 26 of the connection source device and the sensor 116 of the connection destination device may be a microphone. For example, the connection source device or the connection destination device may produce a sound from the speaker of the connection source device or the connection destination device in a state in which the user has brought the connection source device and the connection destination device into proximity to each other. The connection source device may record, as check information, acoustic information on the sound detected by the sensor 26, such as a time of detection, sound volume, frequency characteristics, or the like of the sound detected by the sensor 26. The connection destination device may notify the connection source device of acoustic information on the sound detected by the sensor 116, such as a time of detection, sound volume, frequency characteristics, or the like of the sound detected by the sensor 116 by a search response signal. The connection source device may then determine, as a connection partner device, the transmission source of the search response signal in which the acoustic information matching the check information is set.

As another modification, both of the devices may detect, as a state change, a change in a magnetic field which change occurs when connection object devices are brought into proximity or contact with each other. In this case, the sensor 26 of the connection source device and the sensor 116 of the connection destination device may be a magnetic sensor using a Hall element or the like. In addition, both of the devices may further include a magnet as required.

A fifth modification of the first embodiment will be described.

In the foregoing embodiment, list display of external devices in the surroundings is made at a time of Bluetooth pairing to allow the user to select a device to be registered. As a modification, an automatic connection by the abutment of connection object devices against each other as described in the embodiment may be applied to pairing. For example, when the game machine 10 and the headset 12 are paired with each other, the user makes the game machine 10 and the headset 12 lightly butt against each other. The game machine 10 records a state change as check information. The headset 12 notifies a state change by an extended search response signal. When the contents notified from the headset 12 match the check information, the pairing section 74 of the game machine 10 may recognize the headset 12 as a pairing partner device, and automatically transmit a pairing request signal to the headset 12 to automatically perform exchange of a passkey or the like. As a further modification, whether or not pairing has been performed may be determined by referring to connection information, and a pairing request signal may be transmitted to an external device with which pairing has not been performed yet, whereas a connection request signal is transmitted to an external device with which pairing has already been performed.

A sixth modification of the first embodiment will be described.

In the foregoing embodiment, when a search response signal matching the check information is received, a connection to the transmission source of the search response signal is established automatically. As a modification, the display control section 54 of the connection source device may display a screen showing the transmission source device of the search response signal matching the check information as a connection candidate device, and allow the user to select whether or not to connect to the connection candidate device. In addition, a selecting screen may be displayed which shows a list of a plurality of devices that have returned a search response signal while showing the transmission source device of the search response signal matching the check information as a connection candidate device in a mode in which the connection candidate device is highlighted more than the other devices. Then, the user may be allowed to select a connection partner device finally. The highlighting mode may be a display at the top of the list of the plurality of devices, or may be a display using capital letters or a highlighting color.

A seventh modification of the first embodiment will be described.

In the foregoing embodiment, when the game machine 10 receives a search response signal matching the check information, the game machine 10 performs processing of establishing a connection to the transmission source of the search response signal. As a modification, when the game machine 10 receives a search response signal matching the check information, the game machine 10 may perform various kinds of communication processing other than the connection establishment processing on the transmission source device of the search response signal. For example, processing may be performed to cut off (discard) an already established connection to the transmission source device of the search response signal matching the check information.

An eighth modification of the first embodiment will be described.

In the foregoing embodiment, connection object devices are made to abut against each other, and time stamp information indicating times of detection of state changes in both of the devices is checked. As a modification, a time difference simply expressed as a difference of clocks (Bluetooth clocks) serving as a reference for Bluetooth communication may be used. For example, the check information setting section 60 of the game machine 10 may record a value At indicating a number of clocks from a present time back to timing of detection of a state change in the check information retaining section 44 at a time of transmission of a search signal. In addition, the state change notifying section 148 of the headset 12 may set a value At indicating a number of clocks from a present time back to timing of detection of a state change in a search response signal at a time of transmission of the search response signal. Then, the checking section 62 of the game machine 10 may determine whether or not Δt retained in the check information retaining section 44 and Δt included in the search response signal match each other (for example whether or not the difference is within a predetermined range), and the connection object identifying section 64 may determine a device that has returned a matching At as a connection partner.

Second Embodiment

Figure 11:
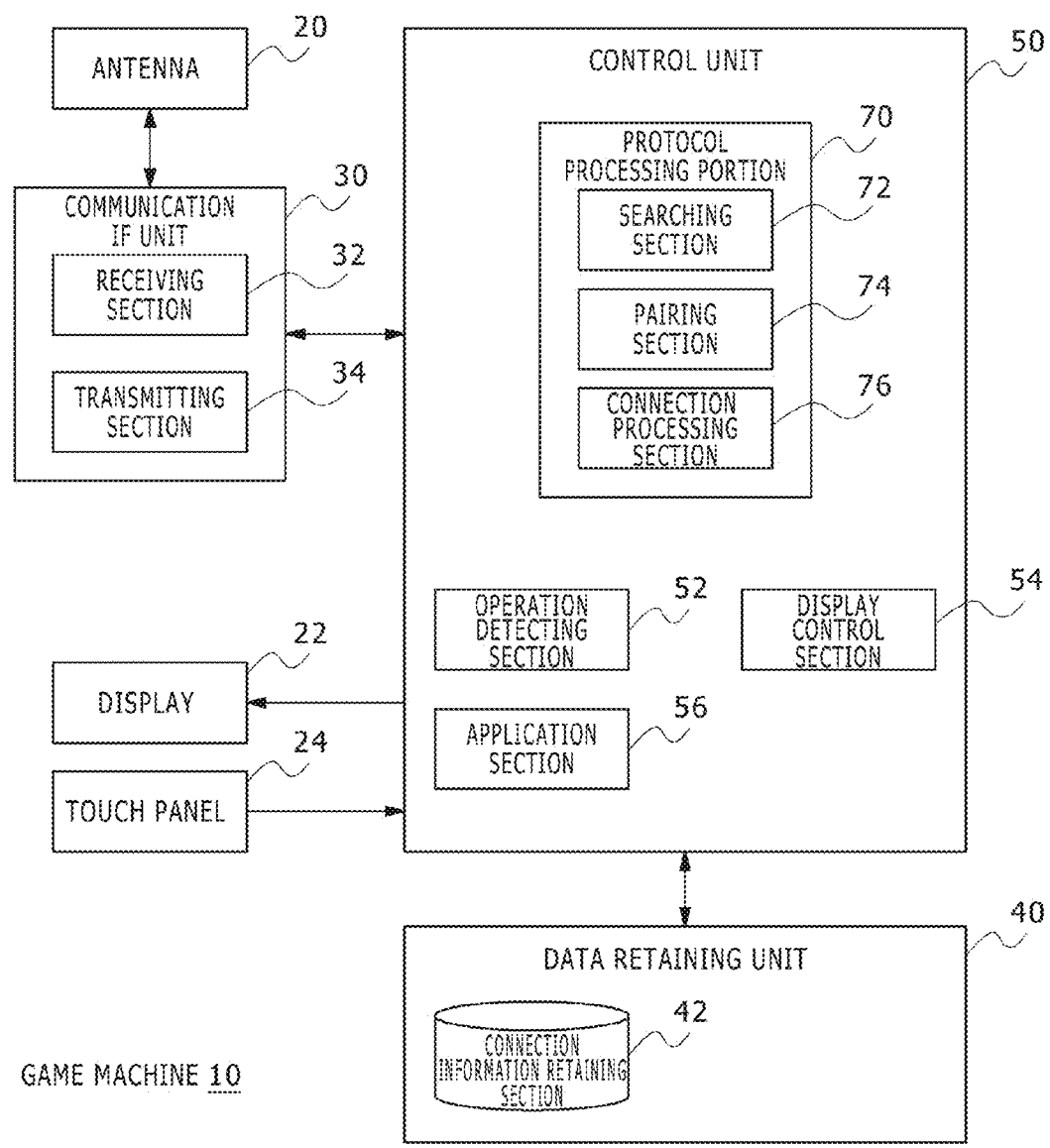
FIG. 11 is a block diagram showing a functional configuration of the game machine in FIG. 1.

FIG. 11 is a block diagram showing a functional configuration of the game machine 10 in FIG. 1. As will be described later in detail, in a communication system 100 according to a second embodiment, a headset 12 determines a connection partner device, and a connection request is transmitted from the headset 12 to a connection partner device. It therefore suffices for the game machine 10 in the second embodiment to have a configuration of an ordinary game machine that supports Bluetooth communication. FIG. 11 corresponds to FIG. 2. In FIG. 11, identical or corresponding functional blocks are identified by the same reference numerals. Each of the functional blocks in FIG. 11 has already been described in the first embodiment, and therefore description thereof will be omitted in the following.

Figure 12:
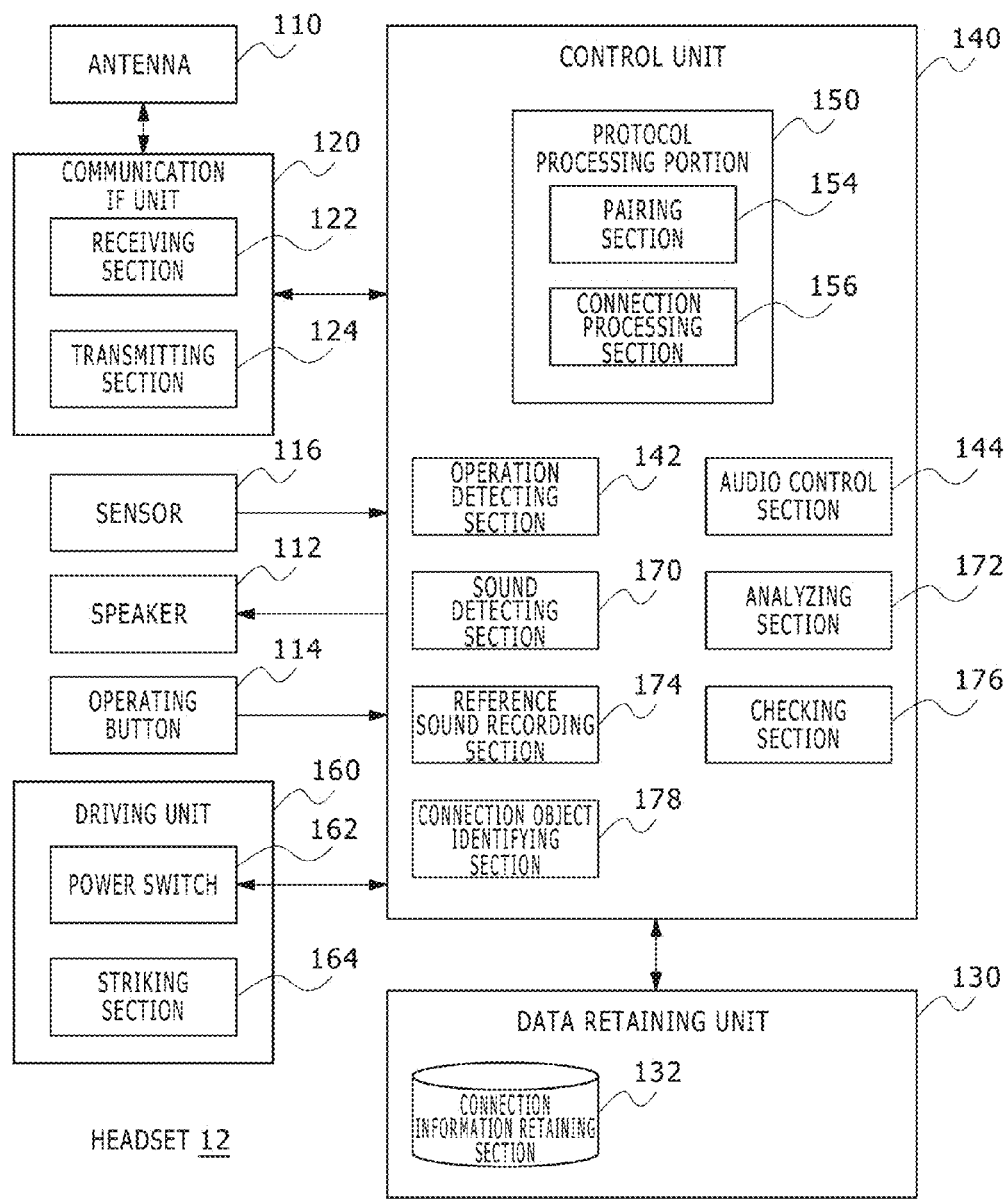
FIG. 12 is a block diagram showing a functional configuration of the headset in FIG. 1.

FIG. 12 is a block diagram showing a functional configuration of the headset 12 in FIG. 1. FIG. 12 corresponds to FIG. 3. In FIG. 12, identical or corresponding functional blocks are identified by the same reference numerals. In the following, description of configurations already described in the first embodiment will be omitted as appropriate, and description will be made mainly of configurations different from those of the first embodiment. The headset 12 in the second embodiment further includes a driving unit 160. In addition, a control unit 140 of the headset 12 further includes a sound detecting section 170, an analyzing section 172, a reference sound recording section 174, a checking section 176, and a connection object identifying section 178.

As in the first embodiment, functions of the control unit 140 may be implemented by a dedicated electronic circuit. In addition, the functions of the control unit 140 may be implemented by storing program modules corresponding to the respective functional blocks of the control unit 140 in a flash memory of the headset 12, and reading out these program modules to a main memory and executing the program modules as appropriate on the part of a CPU of the headset 12. In addition, the data retaining unit 130 may be implemented by the flash memory and the main memory of the headset 12. In addition, the functions in FIG. 12 may be implemented by installing, onto the headset 12 having a predetermined sensor (specifically a microphone) and the driving unit 160, a computer program in which functions of the sound detecting section 170, the analyzing section 172, the reference sound recording section 174, the checking section 176, and the connection object identifying section 178 are implemented.

A connection information retaining section 132 retains connection information necessary to establish a connection to an external Bluetooth-compatible device and characteristic data of a striking sound produced by collision of a striking section 164 with the connection partner device in association with each other. The connection information may be for example a record associating a device ID, an address, and a passkey (that is, a "PIN") of the external device with each other. The connection information and the characteristic data of the striking sound are set at a time of Bluetooth pairing.

A pairing section 154 receives a pairing request transmitted from an external information device (for example the game machine 10), performs predetermined pairing processing, and stores connection information related to the pairing request source in the connection information retaining section 132. As a modification, the pairing section 154 may transmit a pairing request to an external information device (for example the game machine 10), and perform pairing processing. A connection processing section 156 transmits a connection request to a connection partner device determined by the connection object identifying section 178 to be described later, and establishes a Bluetooth connection to the connection partner device. Incidentally, the connection processing section 76 of the game machine 10 receives the connection request from the headset 12 and performs predetermined connection processing to establish a Bluetooth connection to the headset 12.

The driving unit 160 is a member in which a power switch 162 and the striking section 164 are formed integrally with each other. The driving unit 160 collectively receives a user operation for turning on power and a user operation for giving a predetermined physical stimulus (applying an impact in the present embodiment) to a connection partner device as a series of operations.

Figure 13:
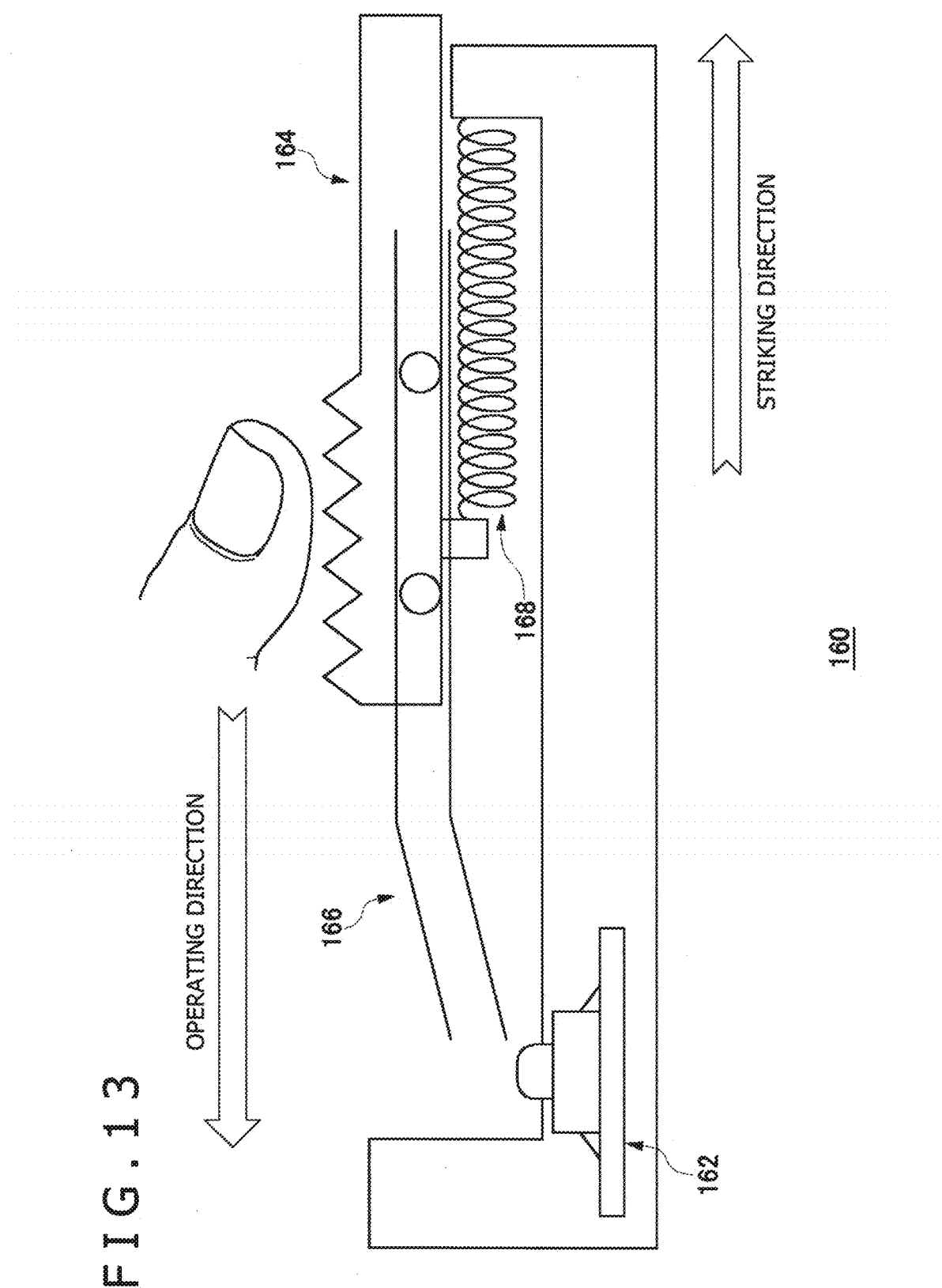
FIG. 13 is a diagram schematically showing an example of configuration of a driving unit.

FIG. 13 schematically shows an example of constitution of the driving unit, and shows an initial state of the driving unit before the user operations. In the driving unit 160, the power switch 162 is fixed at a predetermined position, whereas the striking section 164 is provided so as to be movable along a rail 166. The user slides the striking section 164 in an operating direction, and makes the striking section 164 abut against the power switch 162 to turn on power to the headset 12. In this case, a spring 168 is fixed to the striking section 164. The spring 168 is stretched as the user slides the striking section 164 in the operating direction in the figure. The striking section 164 is then made to abut against the power switch 162. When the user removes the finger, the striking section 164 moves in a striking direction and returns to the initial state due to the restoring force of the spring 168. At this time, an end of the striking section 164 hits the connection partner device (the hitting includes collision, abutment, pressure contact, and the like), producing a striking sound.

By providing the driving unit 160 into which the power switch 162 and the striking section 164 are thus integrated, it is easy to apply an impact of a fixed force to the connection partner device at a time of the power operation. As a result, a striking sound having fixed acoustic characteristics can be produced easily, and therefore the accuracy of a check to be described later can be increased. Incidentally, the configuration of the striking section 164 is not limited to the mode shown in FIG. 13. It suffices for the striking section 164 to be configured to be able to apply a predetermined physical impact to an external device via a contact surface. Thus, the striking section 164 may also be formed by a solenoid, a piezoelectric element, or a latch mechanism, for example.

The striking sound produced by the collision of the striking section 164 with the connection partner device includes an echo sound returned after the impact propagates through the internal structure of the connection partner device. The striking sound including the echo sound of the connection partner device reflects mechanical attributes (for example shape, dimensions, density, material, and constitution) of the connection partner device, and can thus be said to be a kind of "fingerprint" unique to the connection partner device. That is, striking sounds produced when the striking section 164 collides with the game machine 10, the smart phone 14, the tablet terminal 16, and the storage device 18, respectively, are different from each other. As will be described later, a frequency distribution unique to a connection partner device with which the striking section 164 collides can be obtained by frequency analysis of a detected striking sound. Accordingly, the headset 12 identifies a connection partner device by analyzing a striking sound produced by collision of the striking section 164 with the connection partner device, and achieves an automatic connection by Bluetooth.

Returning to FIG. 12, a sensor 116 is a microphone. The sensor 116 detects sound in the surroundings of the headset 12, and sends out the data of the sound to the control unit 140. When the sound detecting section 170 receives the sound data sent out from the sensor 116, and the sound volume of the sound data is equal to or higher than a predetermined value, the sound detecting section 170 recognizes that the sound data indicates a striking sound produced by collision of the striking section 164 with an external device, and passes the sound data to the analyzing section 172. The analyzing section 172 performs publicly known acoustic analysis processing on the sound data passed from the sound detecting section 170, and thereby obtains acoustic characteristic data indicating the characteristics of the striking sound. For example, the sound data passed from the sound detecting section 170 may be subjected to a Fourier transform, whereby data indicating the frequency distribution of the striking sound is obtained as acoustic characteristic data.

In this case, when the power switch 162 is pressed long for a predetermined time or more in turning on the power, the control unit 140 changes the communication mode of the headset 12 to a pairing mode. When the depression time of the power switch 162 is less than the predetermined time, on the other hand, the control unit 140 changes the communication mode of the headset 12 to a connecting mode. As already described, the striking section 164 strikes an external device as the power is turned on. Thus, the acoustic characteristic data of a striking sound caused by the striking section 164 is obtained in either of the pairing mode and the connecting mode.

In the pairing mode, when the acoustic characteristic data of a sound detected by the sound detecting section 170 (that is, a striking sound caused by the striking section 164) is obtained, the reference sound recording section 174 temporarily stores the acoustic characteristic data in a predetermined storage area. Then, when the pairing section 154 has performed pairing processing, the reference sound recording section 174 stores the acoustic characteristic data in the connection information retaining section 132 in association with connection information set by the pairing section 154. The acoustic characteristic data stored in the connection information retaining section 132 in association with the connection information will hereinafter be referred to also as "reference sound data."

In the connecting mode, when the acoustic characteristic data of a sound detected by the sound detecting section 170 (that is, a striking sound caused by the striking section 164) is obtained, the checking section 176 determines whether or not there is a reference sound matching the detected sound by checking the obtained acoustic characteristic data against one or more pieces of reference sound data stored in the connection information retaining section 132 in advance. The checking section 176 may determine whether or not the acoustic characteristics of the detected sound and the acoustic characteristics of a reference sound match each other by a publicly known technology. For example, when the frequency distribution of the detected sound and the frequency distribution of a reference sound are similar to each other, or in other words a difference between the frequency distribution of the detected sound and the frequency distribution of the reference sound is within a predetermined range, the checking section 176 may determine that the detected sound and the reference sound match each other. When there is a reference sound matching the detected sound, the connection object identifying section 178 identifies, as a connection partner device, an external device indicated by the connection information associated with the reference sound data in the connection information retaining section 132.

The operation of the above configurations will be described in the following.

Figure 14:
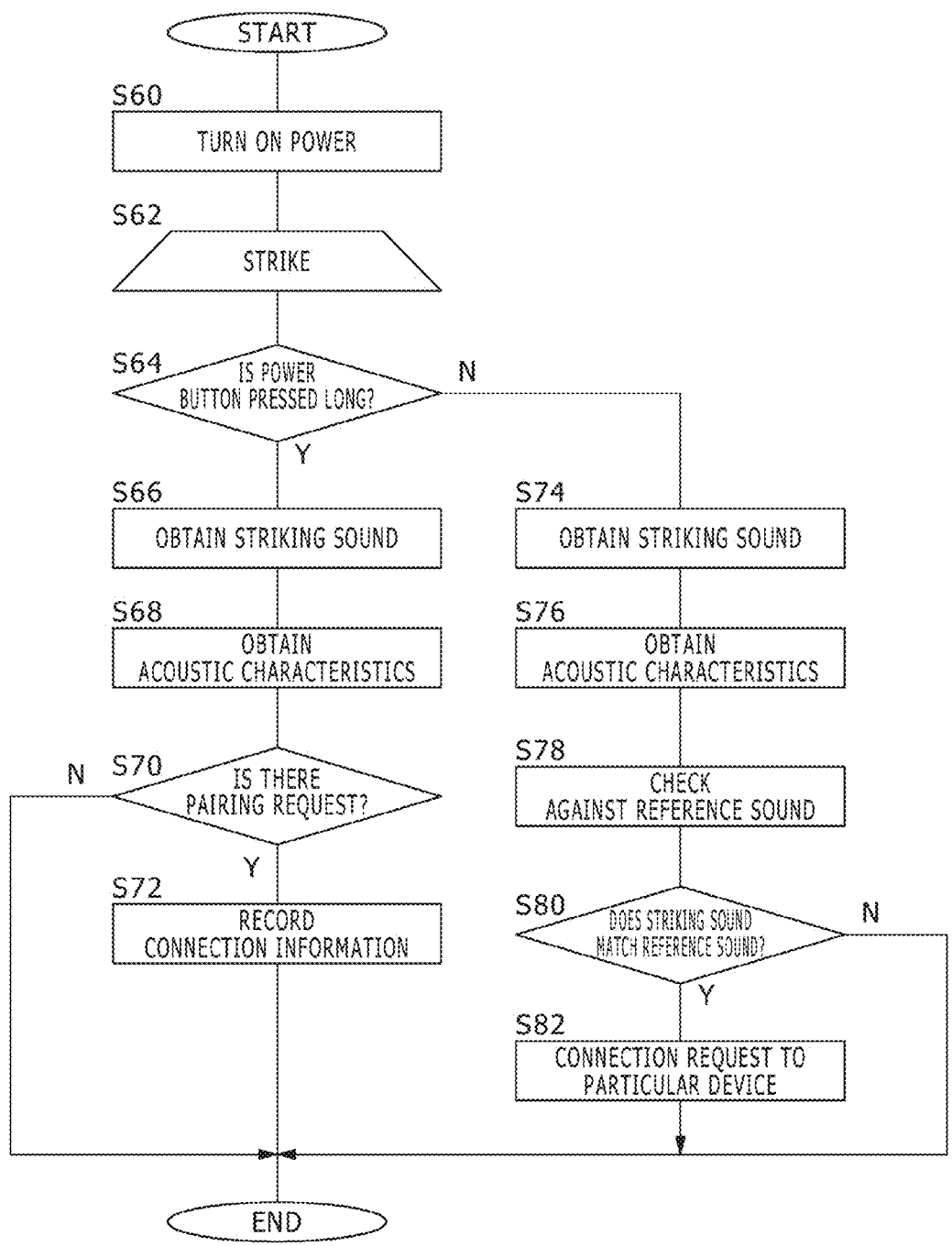
FIG. 14 is a flowchart of operation of the headset in FIG. 1.

FIG. 14 is a flowchart showing the operation of the headset 12 in FIG. 1. The user slides the striking section 164 to turn on the power to the headset 12 in a state in which the headset 12 is held in proximity to a desired connection object device (suppose in this case that the desired connection object device is the game machine 10) (S60). When the user removes the finger from the striking section 164, the striking section 164 collides with the game machine 10, producing a striking sound (S62).

Figure 15:
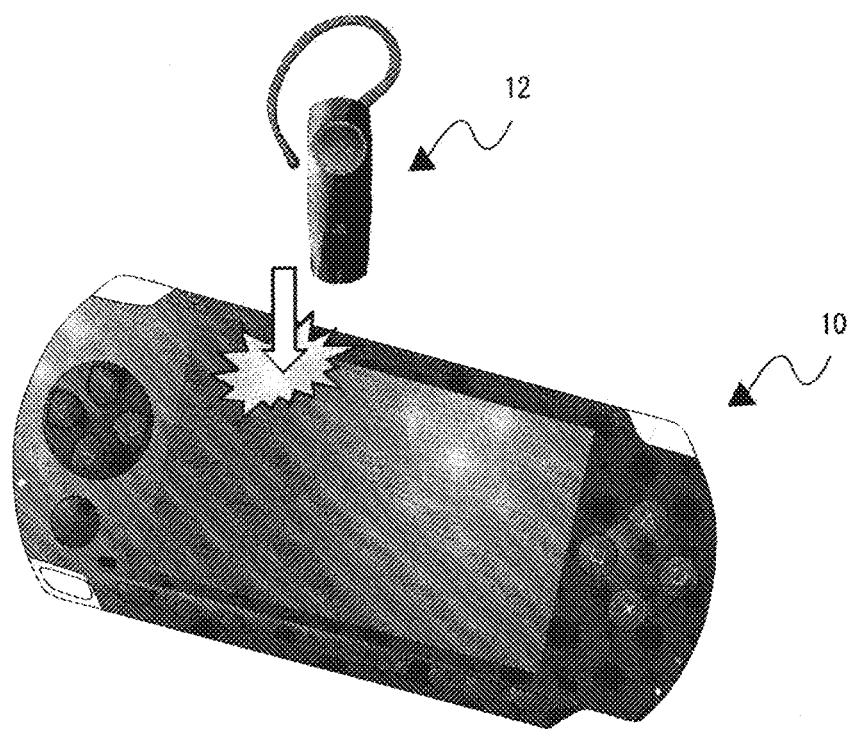
FIG. 15 is a diagram schematically showing the butting of the headset and a connection object device against each other.
Figure 16:
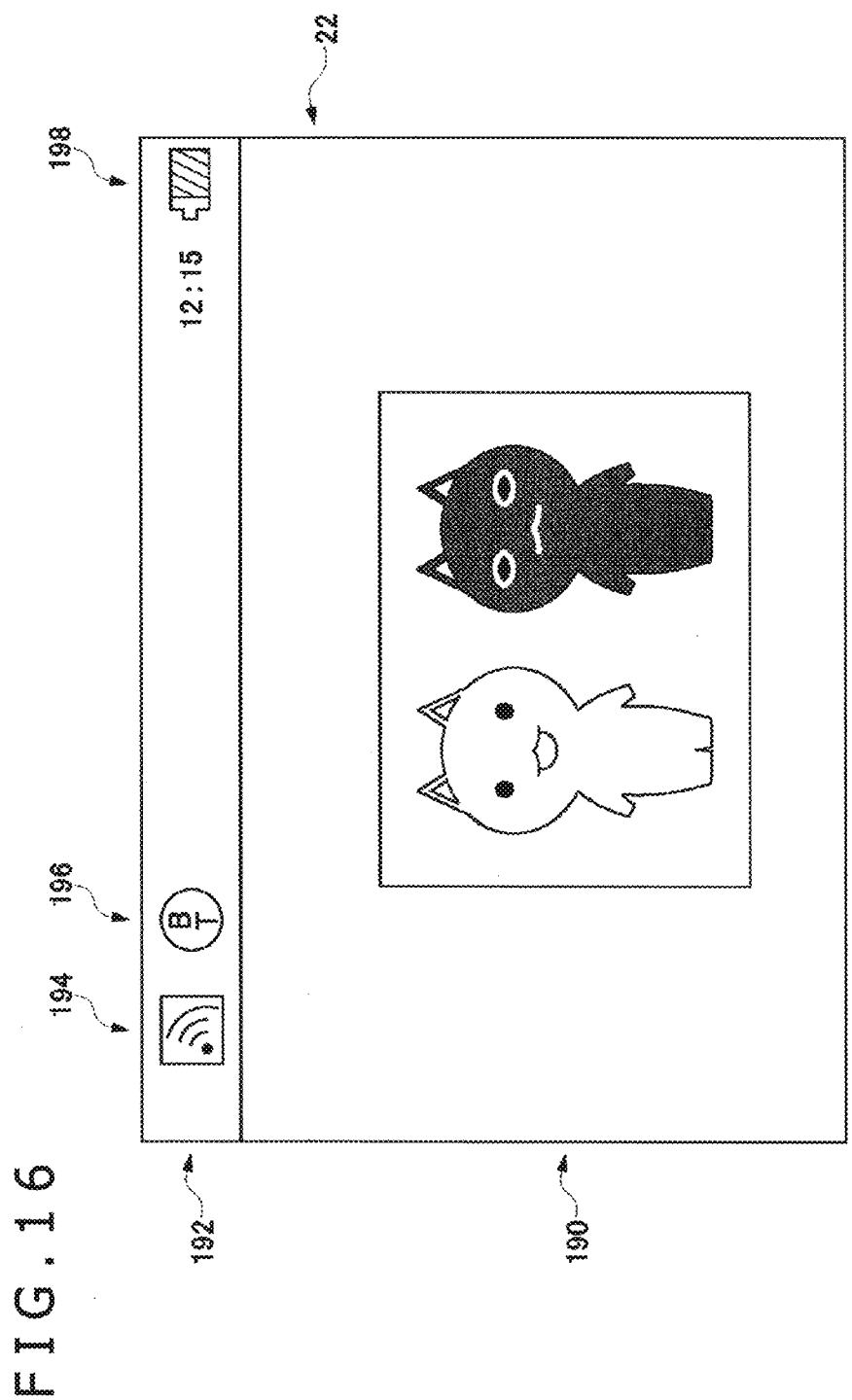
FIG. 16 is a diagram schematically showing contents displayed on the display of the connection object device.

FIG. 15 schematically shows the butting of the headset 12 and the connection object device against each other. As shown in FIG. 15, in the present embodiment, the striking section 164 (not shown) of the headset 12 applies an impact to the display 22 of the game machine 10. FIG. 16 schematically shows contents displayed on the display of the connection object device. The screen of the display 22 is provided with an application display region 190 for displaying the information of an application being executed in the game machine 10 and a state display region 192 for displaying various kinds of icons indicating states of the game machine 10. The state display region 192 includes a Wi-fi (registered trademark) icon 194 for indicating that Wi-fi connection is possible, a Bluetooth icon 196 for indicating that Bluetooth connection is possible, and a battery icon 198 for indicating an amount of charge remaining in a battery. In the present embodiment, when the user desires to perform connection processing by Bluetooth, the user applies an impact to the Bluetooth icon 196 by the striking section 164 of the headset 12.

Even when an impact is applied to the same connection partner device, a detected striking sound differs according to a position to which the impact is applied. It is therefore desirable that an impact position at a time of pairing for obtaining a reference sound be the same as an impact position at a time of a subsequent connection. Here, Bluetooth-compatible devices having a screen often display a symbol representing Bluetooth at a predetermined fixed position on the screen. Accordingly, in the present embodiment, an impact is applied to the display position of the Bluetooth icon 196 on the screen at both of the time of pairing and the time of connection. Thereby, a striking sound obtained by striking the display position of the Bluetooth icon 196 at the time of pairing is recorded as reference sound data, and a striking sound obtained by striking the same position at the time of connection is checked against the reference sound. It is therefore possible to reduce difference between the striking sounds when impacts are applied to the same connection partner device, and thus increase the accuracy of the check. In addition, the Bluetooth icon 196 on the screen is often not displayed or is often displayed in a mode indicating a disabled state of the Bluetooth function when the Bluetooth function is off in the connection partner device (for example the game machine 10). Hence, another effect is produced in that the user can be easily made to grasp whether or not the connection partner device desired by the user can make a Bluetooth connection.

As a modification, when the casing of the connection partner device is provided with a symbol indicating that the connection partner device is a Bluetooth-compatible device, for example when characters or a design indicating Bluetooth is printed (impressed) on the casing, an impact may be applied to a position at which the Bluetooth symbol is set on the casing by the striking section 164 of the headset 12. The present modification is suitable particularly for cases where the connection partner device is a device that does not have a screen, for example the storage device 18 in FIG. 1, a stationary type game machine separated from a display, or the like. Also in the present modification, when impacts are applied to the same connection partner device, striking sounds having same acoustic characteristics are produced easily, so that the accuracy of the check can be increased.

Returning to FIG. 14, when the user long presses the power switch 162 via the striking section 164 for a predetermined time or more in the operation of turning on the power (Y in S64), the operation state of the headset 12 changes to the pairing mode. In the pairing mode, the sound detecting section 170 detects a striking sound caused by the striking section 164 (S66), and the analyzing section 172 obtains the acoustic characteristics of the striking sound (S68). When a pairing request from the game machine 10 is then received from the game machine 10 (Y in S70), the reference sound recording section 174 stores the acoustic characteristic data of the striking sound obtained by striking the game machine 10 in association with connection information as a result of pairing processing (S72). For example, connection information and the acoustic characteristic data of striking sound of each of the game machine 10, the smart phone 14, the tablet terminal 16, and the storage device 18 are stored. When no pairing request is received (N in S70), S72 is skipped. Incidentally, in the case of N in S70, the pairing section 154 may send a pairing request to the outside to set connection information.

When the depression time of the power switch 162 is less than the predetermined time in the operation of turning on the power (N in S64), the operation state of the headset 12 changes to the connecting mode. In the connecting mode, the sound detecting section 170 detects a striking sound caused by the striking section 164 (S74), and the analyzing section 172 obtains the acoustic characteristics of the striking sound (S76). The checking section 176 checks the detected striking sound against reference sounds retained in the connection information retaining section 132 (S78). When there is a reference sound matching the detected striking sound (Y in S80), the connection processing section 156 transmits a connection request to the connection partner device according to the connection information associated with the reference sound (S82). For example, a connection request using the connection information of an external device that has collided with the striking section 164, or the game machine 10 in this case, among pieces of connection information of the respective devices which pieces of connection information are stored in the connection information retaining section 132 is transmitted from the antenna 110.

After a connection to the game machine 10 is established, the receiving section 122 receives audio data transmitted from the game machine 10, and the audio control section 144 passes the audio data to the speaker 112 for audio output. When there is no reference sound matching the detected striking sound (N in S80), S82 is skipped. As alternative processing in the case of N in S80, a connection request may be transmitted to an information device registered as a predetermined connection destination in advance in the headset 12 by the user or an information device to which the headset 12 was last connected. In addition, as other alternative processing in a case where the headset 12 has a screen interface, already paired information devices (that is, external devices indicated by the connection information retained in the connection information retaining section 132) may be displayed in a list on the screen to allow the user to select an information device to be connected.

According to the communication system 100 according to the second embodiment, even when there are many Bluetooth-compatible devices in the vicinity range, the user can easily establish a connection between desired devices by an intuitive operation of making a connection source device lightly collide with a desired connection destination device (turning on power in a state of the connection destination device and the connection source device being in proximity to each other or abutting against each other in the embodiment). For example an operation for finding and selecting a desired device from among a plurality of devices on a screen for selecting a connection partner device, an operation for disconnecting a session with a present connection partner device and establishing a new connection to a desired device, or the like is unnecessary. Thus the complexity of the user operation can be reduced. That is, a reduction in the convenience of the user at a time of connecting desired devices to each other in an environment in which a plurality of information devices are present can be suppressed.

In addition, according to the second embodiment, the connection destination device (game machine 10 in the example of the embodiment) does not need to have a special configuration, or in other words, a connection between devices can be realized easily by merely making provisions in the connection source device (headset 12 in the example of the embodiment). Further, as described in the first embodiment, the connection system according to the embodiment is useful also in cases where both of information devices to be connected to each other do not have a screen interface (for example when the headset 12 and the storage device 18 are desired to be connected to each other).

The present invention has been described above on the basis of the second embodiment. The embodiment is illustrative, and it is to be understood by those skilled in the art that combinations of constituent elements and processing processes of the embodiment are susceptible of various modifications and that such modifications also fall within the scope of the present invention. Modifications will be shown in the following.

A first modification of the second embodiment will be described.

In the foregoing embodiment, the acoustic characteristics of a striking sound obtained at a time of Bluetooth pairing are recorded as reference sound data, and the reference sound data is used as check data at a time of a subsequent connection. As a modification, when an impact is applied to a connection partner device by the striking section 164 in a connected state after a Bluetooth connection is established, the already stored reference sound data may be updated on the basis of the acoustic characteristic data of the striking sound. For example, the acoustic characteristics of a striking sound obtained during the connection may be set as new reference sound data, and the original reference sound data may be replaced with the new reference sound data. In addition, the reference sound data may be refined by a publicly known audio processing technology such for example as leveling the acoustic characteristics of the striking sound obtained during the connection and the acoustic characteristics of the original reference sound data. This can sequentially refine the reference sound data, and thus improve the quality of the check data. In addition, even when an impact position at which an impact is applied to the connection partner device is changed, a reference sound corresponding to the impact position after the change can be set. It is thus easy to deal with changes in the impact position.

A second modification of the second embodiment will be described.

The connection source device (headset 12 in the embodiment) that applies an impact to the connection partner device does not need to have the striking section 164. The connection source device may apply a predetermined physical stimulus (for example an impact) to the connection partner device at an arbitrary position on the casing of the connection source device, and detect a sound produced at that time by the sensor 116 (microphone). In addition, the user may apply a predetermined physical stimulus to the connection partner device using means or a medium other than the connection source device in a state in which the connection source device and the connection partner device are in proximity to each other, and the connection source device may detect a sound attendant on the action of the user by the sensor 116.

A third modification of the second embodiment will be described.

In the foregoing embodiment, a striking sound is detected by applying an impact to the connection partner device by the striking section 164 of the headset 12. As a modification, the headset 12 or the connection partner device may output a predetermined sound for a connection from the speaker of the headset 12 or the connection partner device itself, and the sensor 116 of the headset 12 may detect the sound. As with the striking sound in the embodiment, the detected sound in this case also includes echo sound unique to the connection partner device which echo sound reflects the physical attributes of the connection partner device. Therefore connection processing similar to that of the embodiment can be realized.

A fourth modification of the second embodiment will be described.

In the foregoing embodiment, a striking sound is detected by applying an impact to the connection partner device by the striking section 164 of the headset 12, and the acoustic characteristics of the striking sound are recorded as reference sound data. As a modification, reference sound data for each kind of connection partner device may be distributed from an external server via a communication network, and the headset 12 may be connected to the communication network to obtain and store the reference sound data distributed from the external server. For example, reference sound data for the game machine 10, reference sound data for the smart phone 14, and the like may be distributed. As another modification, the headset 12 may be shipped after data associating the reference sound data of products already on sale with device IDs is recorded in firmware (for example the connection information retaining section 132) of the headset 12 in advance. These modifications are suitable for cases where a position at which to apply an impact to the connection partner device is set at a predetermined position, for example the display position of a Bluetooth symbol or the like.

A fifth modification of the second embodiment will be described.

The present modification corresponds to the third modification of the first embodiment. The connection source device (headset 12 in the embodiment) may be connected to an external device that has a physically different casing and which has the sensor 116 and the striking section 164 (which device will hereinafter be referred to as an "accessory device"). The accessory device (for example a controller) may detect a striking sound caused by the striking section 164, and notify the striking sound to the connection source device. The connection source device may set reference sound data on the basis of the data of the striking sound notified from the accessory device, and perform checking processing. According to the present modification, a wireless connection to an external device can be realized easily even when the connection source device itself does not have the sensor 116 nor the striking section 164.

A sixth modification of the second embodiment will be described.

In the foregoing embodiment, when there is a reference sound matching a detected sound, the headset 12 performs processing of establishing a connection to an external device associated with the reference sound. As a modification, when there is a reference sound matching a detected sound, the headset 12 may perform various kinds of communication processing other than the connection establishment processing on an external device associated with the reference sound. For example, when there is a reference sound matching a detected sound, processing may be performed to cut off (discard) an already established connection to an external device associated with the reference sound.

A seventh modification of the second embodiment will be described.

The present modification corresponds to the sixth modification of the first embodiment. In the foregoing embodiment, when there is a reference sound matching a detected sound, a connection to an external device associated with the reference sound is established automatically. The headset 12 in the present modification further includes a display control section for controlling screen display contents on a predetermined display device. The display control section may display a screen showing an external device associated with a reference sound matching a detected sound as a connection candidate device, and allow the user to select whether or not to connect to the connection candidate device. In addition, when it is determined that a plurality of reference sounds match a detected sound (differences are within a predetermined range), the display control section 54 may display a screen indicating a plurality of external devices associated with the plurality of reference sounds as connection candidate devices, and allow the user to select whether or not to connect to one of the devices.

An eighth modification of the second embodiment will be described.

The headset 12 in the present modification further includes a display control section for controlling screen display contents on a predetermined display device. The display control section may display user assistance information that presents, to the user, a position at which to apply a predetermined physical stimulus (for example an impact) to an external device. Specifically, user assistance information may be displayed which shows, as an impact position, a Bluetooth symbol displayed at a predetermined position on the display device of the external device.

Modifications common to the first embodiment and the second embodiment will be described.

In the foregoing first and second embodiments, Bluetooth has been illustrated as a communication system between information devices. However, the technologies described in the embodiments can of course be applied to other communication systems. For example, the communication system may be Wi-fi, and a state change in a connection destination device may be notified to a connection source device by a beacon in place of the search signal and the search response signal in the embodiments. In addition, the communication system may be a system compliant with DLNA (registered trademark) (Digital Living Network Alliance). Further, without being limited to wireless communications, the technologies described in the embodiments can of course be applied also to cases where a connection is established between information devices by wire communication (for example a wired LAN). When a communication system other than Bluetooth is adopted, the protocol processing portions in FIG. 2, FIG. 3, FIG. 11, and FIG. 12, for example, may be replaced with functional blocks supporting the adopted communication system as appropriate.

Arbitrary combinations of the embodiments and the modifications described above are also useful as embodiments of the present invention. New embodiments created by the combinations combine the respective effects of the embodiments and the modifications combined with each other.

For example, the technologies proposed in the first embodiment and the technologies proposed in the second embodiment may be combined with each other in the communication system 100. For example, a first device in the communication system 100 may have a configuration corresponding to the game machine 10 in the first embodiment, and a second device in the communication system 100 may have a configuration corresponding to the headset 12 in the second embodiment. In this case, the user may make the first device and the second device lightly butt against each other, so that an impact common to both of the devices is detected, and a sound is produced. Therefore, the reliability of a connection between devices desired by the user can be further increased by combining the two checking means proposed in the first and second embodiments with each other.

In addition, both of a configuration corresponding to the game machine 10 in the first embodiment and a configuration corresponding to the headset 12 in the second embodiment may be provided within one device. In this case, a connection request may be transmitted to a connection partner device identified by at least one of first connection partner identifying processing based on the notification of a state change from the connection partner device and second connection partner identifying processing based on a striking sound obtained by striking the connection partner device. For example, the first connection partner identifying processing may be performed first, and the second connection partner identifying processing may be performed next when the connection partner cannot be identified by the first connection partner identifying processing. Combinations of devices that can use an easy connection based on an operation intuitive for the user can be diversified by thus using two kinds of connection partner identifying processing complementarily. That is, the first connection partner identifying processing provides high connection reliability, but requires also the connection partner device to have a configuration for detecting and notifying a state change. On the other hand, the second connection partner identifying processing may be affected by an environment including noise or the like, but can be completed with the single connection source device, with an ordinary Bluetooth-compatible device, for example, sufficing as the connection partner device, so that devices that can be connected by the easy connection can be diversified. In other words, the reliability of the easy connection and an increase of connectable devices can be made compatible with each other.

It is also to be understood by those skilled in the art that functions to be performed by respective constituent elements described in claims are realized by respective single constituent elements shown in embodiments and modifications or cooperation thereof.

REFERENCE SIGNS LIST

32 Receiving section, 42 Connection information retaining section, 44 Check information retaining section, 54 Display control section, 58 State change detecting section, 60 Check information setting section, 62 Checking section, 64 Connection object identifying section, 72 Searching section, 76 Connection processing section, 100 Communication system, 124 Transmitting section, 132 Connection information retaining section, 134 Sensor information retaining section, 146 State change detecting section, 148 State change notifying section, 156 Connection processing section, 164 Striking section, 170 Sound detecting section, 172 Analyzing section, 174 Reference sound recording section, 176 Checking section, 178 Connection object identifying section.

INDUSTRIAL APPLICABILITY

The present invention is applicable to devices that communicate data.

The invention claimed is:

1. A communication device comprising:
   a receiving section receiving, from a given external device among one or more external devices, a signal indicating a state change in the given external device, the state change being caused by a predetermined action of a user, the predetermined action being that the communications device and the given external device bumping into one another, and the signal indicating a state change including sensor information as to an acceleration profile resulting in the given external device from the bumping with the communication device; and
   an identifying section identifying the given external device as a partner device in predetermined communication processing from among the one or more external devices on a basis of the signal indicating the state change, wherein the identifying section identifies the given external device as a partner device:
   (i) when the signal indicating a state change includes the sensor information as to an acceleration profile resulting in the given external device from the bumping with the communication device, and
   (ii) based on a comparison of the sensor information from the signal indicating a state change and further sensor information as to a corresponding acceleration profile resulting within the communication device from the bumping with the external device.

2. The communication device according to claim 1, further comprising:
   a searching section sending a search signal as a radio signal for searching for the given external device,
   wherein the receiving section receives a response signal as a radio signal in response to the search signal from each of the one or more external devices, and receives, from the given external device, a response signal indicating the state change, and
   the identifying section identifies the given external device as a partner device in predetermined wireless communication processing from among the one or more external devices on a basis of the response signal indicating the state change.

3. The communication device according to claim 1, further comprising a connection processing section transmitting, to the partner device, a connection request for establishing a connection to the partner device when the partner device is identified.

4. The communication device according to claim 1, further comprising:
   a check information retaining section retaining information indicating a state change in the partner device, the state change being caused by the predetermined action of the user, as check information in advance,
   wherein when the state change indicated by the signal indicating a state change received from the given external device and the state change indicated by the check information match each other, the identifying section identifies a transmission source of the signal as the partner device.

5. The communication device according to claim 4, wherein:
   the predetermined action of the user is an action for making a state change common to both of the present device and the partner device detected, and
   the communication device further comprises:
   a detecting section detecting an actual state change occurring in the communication device, the state change being caused by the predetermined action of the user, and recording information indicating details or timing of the state change as the check information,
   the partner device detects an actual state change caused by the predetermined action of the user, and transmits a signal indicating details or timing of the state change, and
   when details or timing of the state change indicated by a signal received from one of the one or more external devices and the details or timing of the state change indicated by the check information match each other, the identifying section identifies a transmission source of the signal as the partner device.

6. The communication device according to claim 4, wherein:
   the predetermined action of the user is an action for making the partner device detect a predetermined state change,
   the check information retaining section retains information indicating details or timing of the state change assumed to be detected in the partner device as the check information in advance,
   the partner device detects an actual state change caused by the predetermined action of the user, and transmits a signal indicating details or timing of the state change, and
   when details or timing of the state change indicated by a signal received from one of the one or more external devices and the details or timing of the state change indicated by the check information match each other, the identifying section identifies a transmission source of the signal as the partner device.

7. The communication device according to claim 4, wherein:
   the predetermined action of the user is an action for changing strength of a signal from the partner device,
   the check information retaining section retains information indicating a change in the strength of the signal from the partner device, the change in the strength of the signal from the partner device being assumed to be detected in the present device, as the check information in advance, and when a change in strength of the signal of one of the one or more external devices matches the change in the signal strength indicated by the check information, the identifying section identifies a transmission source of the signal as the partner device.

8. The communication device according to claim 1, further comprising a display control section displaying, on a display device, information prompting for an action of the user for causing a state change in the partner device when the partner device is to be identified.

9. A communication device comprising:
a detecting section detecting a state change in the communication device, the state change being caused by a predetermined action of a user; and
a transmitting section transmitting a signal indicating the state change to a different communication device to be set as a partner in predetermined communication processing, to make the different communication device identify a partner device in the predetermined communication processing from among one or more external devices on a basis of the signal indicating the state change caused by the predetermined action of the user,
wherein the different communication device includes:
a receiving section receiving, from a given external device among the one or more external devices, a signal indicating a state change in the given external device, the state change being caused by the predetermined action of a user, the predetermined action being that the different communications device and the given external device bumping into one another, and the signal indicating a state change including sensor information as to an acceleration profile resulting in the given external device from the bumping with the communication device; and
an identifying section identifying the given external device as a partner device in predetermined communication processing from among the one or more external devices on a basis of the signal indicating the state change, wherein the identifying section identifies the given external device as a partner device:
(i) when the signal indicating a state change includes the sensor information as to an acceleration profile resulting in the given external device from the bumping with the communication device, and
(ii) based on a comparison of the sensor information from the signal indicating a state change and further sensor information as to a corresponding acceleration profile resulting within the communication device from the bumping with the external device.

10. A communication method performed by a communication device, the method comprising:
receiving, from a given external device among one or more external devices, a signal indicating a state change in the given external device, the state change being caused by a predetermined action of a user, the predetermined action being that the communications device and the given external device bumping into one another, and the signal indicating a state change including sensor information as to an acceleration profile resulting in the given external device from the bumping with the communication device; and
identifying the given external device as a partner device in predetermined communication processing from among the one or more external devices on a basis of the signal indicating the state change, wherein the identifying section identifies the given external device as a partner device:
(i) when the signal indicating a state change includes the sensor information as to an acceleration profile resulting in the given external device from the bumping with the communication device, and
(ii) based on a comparison of the sensor information from the signal indicating a state change and further sensor information as to a corresponding acceleration profile resulting within the communication device from the bumping with the external device.

11. A communication method performed by a communication device, the method comprising:
detecting a state change in the communication device, the state change being caused by a predetermined action of a user; and
transmitting a signal indicating the state change to a different communication device to be set as a partner in predetermined communication processing, to make the different communication device identify a partner device in the predetermined communication processing from among one or more external devices on a basis of the signal indicating the state change caused by the predetermined action of the user,
wherein the different communication device executes actions, comprising:
receiving, from a given external device among the one or more external devices, a signal indicating a state change in the given external device, the state change being caused by the predetermined action of a user, the predetermined action being that the different communications device and the given external device bumping into one another, and the signal indicating a state change including sensor information as to an acceleration profile resulting in the given external device from the bumping with the communication device; and
identifying the given external device as a partner device in predetermined communication processing from among the one or more external devices on a basis of the signal indicating the state change, wherein the identifying section identifies the given external device as a partner device:
(i) when the signal indicating a state change includes the sensor information as to an acceleration profile resulting in the given external device from the bumping with the communication device, and
(ii) based on a comparison of the sensor information from the signal indicating a state change and further sensor information as to a corresponding acceleration profile resulting within the communication device from the bumping with the external device.

12. A non-transitory, computer readable recording medium on which a computer program is recorded, the computer program for making a communication device carry out actions, comprising:
receiving, from a given external device among one or more external devices, a signal indicating a state change in the given external device, the state change being caused by a predetermined action of a user, the predetermined action being that the communications device and the given external device bumping into one another, and the signal indicating a state change including sensor information as to an acceleration profile resulting in the given external device from the bumping with the communication device; and
identifying the given external device as a partner device in predetermined communication processing from among the one or more external devices on a basis of the signal indicating the state change, wherein the identifying section identifies the given external device as a partner device:

(i) when the signal indicating a state change includes the sensor information as to an acceleration profile resulting in the given external device from the bumping with the communication device, and (ii) based on a comparison of the sensor information from the signal indicating a state change and further sensor information as to a corresponding acceleration profile resulting within the communication device from the bumping with the external device.

13. A non-transitory, computer readable recording medium on which a computer program is recorded, the computer program for making a communication device carry out actions, comprising:

detecting a state change in the communication device, the state change being caused by a predetermined action of a user; and transmitting a signal indicating the state change to a different communication device to be set as a partner in predetermined communication processing, to make the different communication device identify a partner device in the predetermined communication processing from among one or more external devices on a basis of the signal indicating the state change caused by the predetermined action of the user, wherein the different communication device executes actions, comprising:

receiving, from a given external device among the one or more external devices, a signal indicating a state change in the given external device, the state change being caused by the predetermined action of a user, the predetermined action being that the different communications device and the given external device bumping into one another, and the signal indicating a state change including sensor information as to an acceleration profile resulting in the given external device from the bumping with the communication device; and identifying the given external device as a partner device in predetermined communication processing from among the one or more external devices on a basis of the signal indicating the state change, wherein the identifying section identifies the given external device as a partner device:

(i) when the signal indicating a state change includes the sensor information as to an acceleration profile resulting in the given external device from the bumping with the communication device, and (ii) based on a comparison of the sensor information from the signal indicating a state change and further sensor information as to a corresponding acceleration profile resulting within the communication device from the bumping with the external device.

* * * * *